United States Patent
Frouin et al.

(10) Patent No.: US 6,778,543 B1
(45) Date of Patent: Aug. 17, 2004

(54) METHOD AND DEVICE FOR CONTROLLING THE SYNCHRONIZATION BETWEEN TWO SERIAL COMMUNICATION BUSES OF A NETWORK

(75) Inventors: Laurent Frouin, Rennes (FR); Jean-Paul Accarie, Vern sur Seiche (FR); Yacine Smail El Kolli, Rennes (FR); Falk Tannhauser, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/523,684

(22) Filed: Mar. 13, 2000

(30) Foreign Application Priority Data

Mar. 12, 1999 (FR) .......................................... 99 03094

(51) Int. Cl.[7] .............................................. H04L 12/40
(52) U.S. Cl. ...................... 370/402; 370/503; 375/362; 375/371
(58) Field of Search ................................ 370/389, 401, 370/402, 503, 516, 517, 519; 375/362, 371, 373

(56) References Cited

U.S. PATENT DOCUMENTS

| | | | |
|---|---|---|---|
| 5,052,029 A | | 9/1991 | James et al. ................. 375/107 |
| 5,649,161 A | * | 7/1997 | Andrade et al. ............. 711/167 |
| 5,974,495 A | * | 10/1999 | Lin et al. ...................... 710/127 |
| 6,021,483 A | * | 2/2000 | Adar et al. .................... 712/29 |
| 6,078,980 A | * | 6/2000 | Holland et al. .............. 710/129 |
| 6,345,330 B2 | * | 2/2002 | Chu .............................. 710/65 |
| 6,418,150 B1 | * | 7/2002 | Staats .......................... 370/503 |

FOREIGN PATENT DOCUMENTS

EP  0 695 063 A2  1/1996

OTHER PUBLICATIONS

Bloks, R.H.J., "The IEEE–1394 High Speed Serial Bus", Philips Journal of Research, NL, Elsevier, Amsterdam, vol. 50, No. 1, pp. 209–216.

* cited by examiner

Primary Examiner—Steven H. D Nguyen
Assistant Examiner—Roberta Stevens
(74) Attorney, Agent, or Firm—Fitzpatrick, Cella, Harper & Scinto

(57) ABSTRACT

The invention concerns a method of controlling the synchronization in a data packet communication network (10) having at least two serial communication buses (D, E) interconnected by a bridge ($P_{DE}$) and each defining successive time cycles each having a duration specific to the said bus under consideration, the said method having the following steps:

detection ($C_3$, $C_4$) of a relative drift between the respective cycles of the said at least two serial communication buses, transmission ($C_{10}$, $C_{12}$; $C_{18}$, $C_{17}$) of a command for modifying the duration of the cycle of one of the said at least two serial communication buses, characterised in that the said method includes at least one delay phase ($C_6$, $C_7$; $C_2$, $D_1$, $D_2$) before at least one of the preceding steps.

42 Claims, 11 Drawing Sheets

METHOD AND DEVICE FOR CONTROLLING THE SYNCHRONIZATION BETWEEN TWO SERIAL COMMUNICATION BUSES OF A NETWORK

The present invention concerns a method of controlling the synchronization in a data packet communication network having at least two serial communication buses (D, E) interconnected by a bridge and each defining successive time cycles each having a duration specific to the said bus under consideration, the said method having the following steps:

detection of a relative drift between the respective cycles of the said at least two serial communication buses, transmission of a command for modifying the duration of the cycle of one of the said at least two serial communication buses.

Communication networks are known which are formed from a number of serial communication buses in accordance with the IEEE 1394 standard.

These buses are organized as a network, that is to say they are interconnected by items of interconnection equipment which are referred to as "bridges".

The bridges connecting serial communication buses form more particularly the subject of the P1394.1 standard which is in the process of discussion.

A bridge is an item of equipment composed of two "portals" which makes it possible to interconnect two 1394 buses. A "portal" is a set of 1394 ports belonging to the same 1394 bus.

The bus network thus forms a structure with a tree hierarchy in which one of the buses is considered as the upper bus, referred to as the "root" bus, from which the various other buses constituting the branches of the structure with a tree hierarchy extend.

Each serial communication bus of such a network interconnects various peripherals such as printers, computers, servers, scanners, video recorders, decoders (known by the term "set top boxes"), televisions, digital cameras, video cameras, digital photographic equipment etc.

These peripherals are generally referred to as nodes.

On each serial communication bus of the network, each peripheral or node has an internal clock from which so-called clock pulses are generated at a so-called clock frequency, for example equal to 24.576 MHz.

On each serial communication bus of the network, one of the nodes is referred to as the "Cycle Master" and the "Cycle Master" node of the "root" bus is referred to as the "Net Cycle Master".

Moreover, all "Cycle Master" nodes of the network have a characteristic which is specific to them, since it depends on the frequency of their internal clock, from which the duration of a "reference period" or "cycle" is defined.

The duration of the cycle denoted by T is equal to an integer number $n_{init}$ of dock pulses common or otherwise to all the buses and which is multiplied by the inverse of the frequency of the internal clock specific to the "Cycle Master" node.

The duration of the cycle T is thus for example equal to 125 microseconds.

When two serial communication buses are connected by a bridge, the "Cycle Master" of one of the buses must synchronize its cycles in relation to the cycles generated by the "Cycle Master" of the adjacent bus.

The "Net Cycle Master" node will then generate on the bus, every 125 microseconds, a so-called "cycle star" signal.

This signal intended for the other nodes of the bus informs them that they can send their isochronous data packet associated with each cycle of the bus under consideration, to one or more of the other buses which are connected to the said bus under consideration respectively by one or more bridges.

Furthermore, the specifications of the 1394 standard indicate that the internal clock frequency of a 1394 peripheral must be 24.576 MHz+/−100 ppm which allows, at maximum, a difference of two internal clock cycles every 3 cycles of the bus between two 1394 peripherals.

The maximum difference is in fact obtained when the internal clock frequency of one of the peripherals is 24.576 MHz+100 ppm and the other frequency of the other peripheral is 24.576 MHz−100 ppm.

For example, the frequency of the internal clock specific to the "Net Cycle Master" denoted by $CM_A$ has a value of 24.576 MHz+100 ppm, while that of the internal clock specific to the "Cycle Master" $CM_B$ of a lower level bus which is directly connected to the upper level bus by a bridge has a value of 24.576 MHz−50 ppm.

The communication networks formed from serial communication buses allow the transmission of packets synchronized from the cycles of the buses under consideration. The buses are for example used for transmitting audio/video type data packets in real time.

Thus, when the two "Cycle Masters" mentioned previously, denoted by $CM_A$ and $CM_B$, are taken, with their respective clock frequency values, namely 24.576 MHz+100 ppm and 24.576 MHz−50 ppm, the durations of the cycles calculated for each of the said "Cycle Masters", denoted respectively by $T_A$ and $T_B$, are different on account of the different frequencies of the internal clocks specific to these "Cycle Masters".

FIG. 1 moreover illustrates this phenomenon and shows, on two superposed axes, for one and the same integer number $n_{init}$ such that $T_A = n_{init}/F_A$ and $T_B = n_{init}/F_B$, where F designates the dock frequency of the "Cycle Master" under consideration, a cycle of duration $T_B$ greater than the cycle $T_A$.

In this figure there are depicted, above the first two cycles of the bus, the numbers of two data packets identified by the numbers 1 and 2.

It should also be noted that the case depicted in FIG. 1 is highly improbable in reality since it envisages a null phase displacement at the beginning of each of the first cycles of the two buses.

However, comparison of these two axes reveals a relative drift of the starts of each cycle which corresponds in fact to a change in the phase displacement (null at the time origin in the figure) over time between the cycles under consideration.

Furthermore, two arrows have been depicted between the two axes to indicate the delay with which the data packets denoted by 1 and 2 are transmitted on the bus B after having passed over the bridge interconnecting the buses A and B. It is estimated in effect that the delay depicted here is equivalent to two cycles and is explained by the time necessary for processing the packets in the bridge before their transmission on the bus B.

Thus, in view of the relative time drift noted between the respective cycles of the buses A and B, at the end of a certain number of cycles, a data packet coming from the bus A will not be transmitted at the bus B.

The non-transmission of this data packet therefore risks being highly detrimental for real time data of the audio and/or video type.

This is because, with data for example of video type, it is very important to transmit all the video data packets correctly in order not to degrade the video image obtained from the transmitted packets.

Generally, if it is noted that the duration $T_A$ is less than $T_B$, then one data packet will be lost at the end of a certain number of cycles, which means that one cycle will have been lost and if, on the contrary, $T_A$ is greater than $T_B$, then no data packet will be transmitted during one of the cycles and there will therefore be a cycle devoid of any significance, leading, through that very occurrence, to a loss of synchronization in the processing of audio and/or video type data in real time.

The detection of a relative drift between the cycles which will subsequently be responsible for a lost cycle or one cycle too many is carried out in each bridge, for a given cycle, by counting simultaneously, with the help of registers, the numbers of pulses generated by the clocks of the two buses under consideration and for example comparing these two numbers with one another at regular time intervals.

In order to remedy the drift problem, the P13941 standard makes provision, as soon as a drift is detected at the level of the bridge, to send, to the "Cycle Master" $CM_B$, a message transmitting a command for modification in consequence of the integer number $n_{init}$ of dock pulses, in order to make the cycle durations $T_A$ and $T_B$ coincide.

It should be noted that this resynchronization is carried out only in pairs of buses.

By way of example, the network of the type of that depicted in FIG. 2 has the serial communication buses denoted by A, B, C, D and E which are interconnected in pairs by a bridge: the buses A and B, B and C, C and D, D and E are respectively interconnected by the bridges $P_1$, $P_2$, $P_3$ and $P_4$. Furthermore, the buses A, B, C, D and E each have a "cycle master" denoted respectively by $CM_A$, $CM_B$, $CM_C$, $CM_D$ and $CM_E$.

Detecting the drifts between each pair of buses connected by a bridge, the Applicant has made the following observations: there will be one cycle too many every four cycles between the buses denoted by A and B, one cycle will be lost every eight cycles between the buses denoted by B and C, no drift is detected between the cycles of the buses denoted by C and D, and one cycle will be lost every eight cycles between the buses denoted by D and E.

Therefore, in conforming to the standard mentioned above, the Applicant realized that a number of modification messages to be executed might well arrive at the same "Cycle Master" of a lower bus of the network.

For example, the "Cycle Master" $CM_B$ of the bus B will receive a synchronization command for modifying the duration of its cycle telling it to increase the counting of the number of pulses generated by its clock by one unit, around once every four cycles.

The "Cycle Master" $CM_C$ of the bus C will receive two commands for modifying the duration of its cycle: one corresponding to the propagation of the command mentioned previously and received by the "Cycle Master" of the bus B, the other corresponding to a command for modifying the duration of its cycle telling it to increase the number of pulses generated by its clock by one unit in order to balance out the drift detected between the cycles of the buses B and C. This is because the sending of the synchronization commands for bringing forward ("go-fast") or putting back ("go-slow") the start of the following cycle is carried out by the portal of the bridge which has detected the drift in relation to the adjacent bus. This portal is also referred to as the "Slave Portal"or "Clock Master".

The reaction time, at the level of the bus on which a number of modification messages arrive, between the time the messages are received by the "Cycle Master" concerned and the time they are processed, increases with the number of messages to be processed and therefore with the decreasing level of the bus in the network hierarchy. Thus not all buses of the network enjoy the same time stability on account of their hierarchy.

Moreover, it may be that messages are conflicting and nothing is provided for checking this point Furthermore, the higher the number of synchronization messages, the more the passband of the bus is reduced. Thus the lower level buses have less passband available for data transmission than those of the higher level buses.

The exaggeration of the phenomenon at the lower levels of the network can result in failure of the synchronization of the cycles of the different buses and therefore probably in the loss of data.

The present invention thus aims to remedy at least one of the above-mentioned problems by proposing a method of controlling the synchronization in a data packet communication network having at least two serial communication buses interconnected by a bridge and each defining successive time cycles each having a duration specific to the said bus under consideration, the said method having the following steps:

detection of a relative drift between the respective cycles of the said at least two serial communication buses, transmission of a command for modifying the duration of the cycle of one of the said at least two serial communication buses, characterised in that the said method includes at least one delay phase before at least one of the preceding steps.

Thus, the invention makes provision for waiting, during a delay phase, before undertaking an action of either detecting a drift or transmitting a synchronization command when such an action is necessitated by circumstances. Synchronization command means a command for modifying the duration of the cycle of one of the serial communication buses.

This allows the drifts which occur during this phase to balance one another out "naturally" or to add up without undertaking, at each cycle, one or more actions which would not be essential. The drifts are thus allowed to progress naturally for a duration which may be dictated by the earlier results and/or by other reasons connected with the bridge under consideration.

According to one characteristic, the delay phase has a duration which extends over a number of cycles.

According to a first embodiment of the invention, the delay phase starts after the step of detecting a relative drift between the respective cycles of the said at least two serial communication buses.

Thus, instead of transmitting a command for modifying the duration of the cycle of one of the two serial communication buses as soon as a non-null relative drift is detected between the respective cycles of the said buses, the invention makes provision for waiting before undertaking any modification command transmission.

This makes it possible, as soon as a non-null drift is detected, to not systematically call upon the passband of the bus for transmitting a synchronization command.

According to one characteristic, the delay phase has a number of detection steps.

Each detection step takes place for a given cycle.

By delaying for a short while any action of modifying the duration of a cycle as soon as a non-null drift is detected, benefit can thus be obtained from the "natural" balancing out between this drift and one or more other drifts detected before and/or after this one during one and the same delay phase.

The number of modifications, sometimes conflicting, of the duration of the bus cycles can thus be significantly reduced.

Therefore, the lower level buses are in transmission conditions identical to those of the upper level buses.

Similarly, with the bridges being less often called upon for transmitting commands to the buses with a view to reducing or increasing the duration of their cycle, the said bridges regain in efficiency by thus optimizing their internal processing time.

According to a particular characteristic, the invention provides a step of storing the drift which has just been detected.

According to a particular characteristic, the step of storing the detected drift includes an operation of summing the said detected drift with a stored drift for an earlier cycle.

Thus, the latest detected drift is added to the sum of the successive drifts previously detected at the level of the same bridge. This makes it possible to continuously monitor the change in the summed drift over time.

Moreover, the summing of the various null or non-null drifts detected during the cycles of the delay phase may give rise, at the end of the said phase, by virtue of the "natural" balancing out, to a null stored drift.

Thus, it is no longer necessary to transmit a command for modifying the duration of the cycle of one of the buses.

However, the summing operation is not obligatory in order to know, or at least in order to be able to estimate, the detected drift at the level of a bridge over a number of successive cycles.

This is because, in this case the detected drift for a cycle is stored without summing it with the earlier drifts. For example, the application can be envisaged of digital processing related to the change over time of variations in the detected drift in order to better manage the transmission of cycle duration modification commands.

According to this first embodiment, the method according to the invention includes a step of comparing the stored drift with a predetermined threshold, this threshold corresponding to a value of the drift for which, or beyond which, it is mandatory to carry out a modification of the duration of the cycle of one of the serial communication buses.

This threshold is determined as a function of the results noted during the earlier delay phases and, for example, the results noted on the storing of the drifts.

This threshold is positive or null, or negative or null, according to circumstance, in order to take account of positive values (bringing forward the clock of one of the buses in relation to the clock of the other bus) or negative values (putting back the clock of one of the buses in relation to the clock of the other bus) of the detected and stored drifts.

It is of course favourable to have two thresholds, one positive, in order to avoid drifts which are too large in bringing forward clocks with respect to one another, and the other negative in order to avoid drifts which are too large in putting back clocks with respect to one another.

Thus, when the stored drift is greater in absolute value than the absolute value of the predetermined threshold, then the delay phase comes to an end.

In this embodiment where the stored drift is compared with a predetermined threshold, the delay phase has a duration which extends over a number of cycles which is not determined in advance since it is not known whether drifts are going to be detected for the cycles to come.

According to another characteristic, when the delay phase comes to an end and the stored drift is greater in absolute value than the absolute value of the predetermined threshold, the method includes at least one step of transmitting at least one command for modifying the duration of the cycle of one of the said at least two serial communication buses. It is for example possible that the envisaged modification is proportional to the stored drift.

However, by way of a variant, it is also possible to transmit a command as long as the stored drift is not null.

According to a particular characteristic, the method includes a step of decrementing the absolute value of the stored drift by a value adapted to the modification of the duration of the cycle of one of the said at least two serial communication buses.

This value is thus, for example, proportional to the stored drift in the aforementioned case.

It should be noted that, when the delay phase comes to an end and the stored drift is null, then the method according to the invention makes provision to not institute a step of transmitting a command for modifying the duration of the cycle of one of the buses.

According to a first variant of the first embodiment, the delay phase extends over a predetermined number of cycles allocated to the bridge under consideration.

In this variant embodiment, it is detected whether null or non-null drifts arise throughout these cycles without transmitting a command for modifying the duration of the cycle of one of the buses.

It is only when the predetermined number of cycles is reached that at least one synchronization command is transmitted.

According to a particular characteristic, the communication network having a number of serial communication buses interconnected by bridges and forming a structure with a tree hierarchy from a so-called "root" bus, the predetermined number of cycles allocated to a bridge depends on the position of the said bridge in the structure with a tree hierarchy.

Thus, for example, the further away the bridge is from the "root" bus in the network structure with a tree hierarchy, the larger is this number.

This is because, the further away the bridge is from the "root" bus, the higher the risk of receiving a number of commands, sometimes conflicting, for modifying the duration of the cycle of a bus.

Consequently, monitoring the change in the drifts detected at the level of the bridge under consideration over a certain number of cycles, it is highly probable that the successively detected drifts will balance one another out over time.

This will therefore make it possible to save, as it were, on the number of commands for modifying the duration of the cycle of the bus under consideration to be transmitted.

Furthermore, the predetermined number of cycles allocated to the bridge under consideration can also, or by way of an alternative, depend on the drift detected during at least one earlier delay phase.

It should be noted that a second variant of the first embodiment can be envisaged which uses again the two embodiments which have just been mentioned.

It is a question in this second variant of having an adaptable delay phase which can either extend at most over the predetermined number of cycles mentioned above, or extend over a smaller number of cycles where the summed drifts cross one of the predetermined thresholds.

More particularly, the duration T of a cycle specific to a serial communication bus being determined by a number $n_{init}$ of clock pulses generated by the internal clock of the said bus during this cycle according to the relationship $T=n_{init}/F$, where F designates the frequency of the clock under consideration, the step of detecting the relative drift between the respective cycles of the clocks of the said at least two serial communication buses consists of comparing, with one another, the numbers of pulses generated by the said clocks.

The serial communication buses are for example in accordance with the IEEE 1394 standard, which is advantageous, since the aim of this standard is to combine the interconnection of all multimedia type peripherals in the years to come.

According to a second embodiment of the invention, the delay phase comes to an end before the step of detecting a relative drift between the respective cycles of said at least two serial communication buses.

The Applicant having realized that it is neither essential to undertake an action of detecting a drift at each cycle, nor to transmit a command for modifying the duration of the cycle of one of the buses connected to the bridge under consideration at each cycle, during the delay phase it is waited for the drifts to balance one another out or add up before detecting them.

At the end of the delay phase, it may be that the drifts have balanced one another out in which case the detection step leads to a null drift or one so small that it does not require transmission of a synchronization command. The choice can then be made either to let another similar delay phase continue before instituting a new detection step, or to let a new delay phase elapse before transmitting a synchronization command, but detecting, at each cycle of this new delay phase, the null and non-null drifts which occur.

The other possible case, at the end of the delay phase, is that the drifts have accumulated without balancing out.

In this case it may be decided, for example, to carry out at least one step of transmitting a synchronization command if the detected drift is judged too large.

The modification of the duration of the cycle of one of the buses (synchronization) is, for example, proportional to the detected drift.

However, by way of a variant, it is also possible to transmit a command for modifying the duration of a cycle of one of the buses as long as the detected drift is not null.

It can also be envisaged, if the detected drift is not too large, either to let another similar delay phase continue before carrying out a new detection step, or to let a new delay phase elapse before transmitting a synchronization command, but detecting, at each cycle of this new delay phase, the drifts which occur.

According to a particular characteristic related to this second embodiment, when the delay phase comes to an end and a non-null drift is detected, the said method includes a step of comparing the detected drift with a predetermined threshold in order to determine whether it is mandatory that the detected drift requires the transmission of a synchronization command.

The characteristics specific to this threshold are the same as those described above for the first embodiment of the invention.

According to a particular characteristic, when the detected drift is greater in absolute value than the absolute value of the predetermined threshold, then the said method includes at least one step of transmitting at least one command for modifying the duration of the cycle of one of the said at least two serial communication buses.

The modification of the duration of the cycle of one of the buses (synchronization) is, for example, proportional to the detected drift.

However, by way of a variant, it is also possible to transmit a command for modifying the duration of the cycle of one of the buses as long as the detected drift is not null.

As mentioned previously, when a first delay phase has elapsed and a step of detecting a drift has been carried out, it is possible, provided that the drift is not too large, either to let another similar delay phase continue before instituting a new detection step, or to let a new delay phase elapse before transmitting a synchronization command, but detecting, at each cycle of this new delay phase, the null and non-null drifts which occur.

In each of these two cases, either the detected drift is stored once only and the end of the similar delay phase is waited for, for detecting any drift and storing it, or each detected drift is stored during this new delay phase.

Furthermore, in the two cases envisaged, the step of storing each detected drift can include an operation of summing the latter with a stored drift for an earlier cycle.

Following the summing, either the stored drifts have balanced one another out or they have accumulated, and the method according to the invention then includes a step of comparing the stored drift with a predetermined threshold in order to determine whether it is mandatory that this drift requires the transmission of a synchronization command.

The characteristics of this threshold are the same as those described above for the first embodiment.

According to one characteristic, when the stored drift is greater in absolute value than the absolute value of the predetermined threshold, then the delay phase comes to an end.

The method then includes at least one step of transmitting at least one command for modifying the duration of the cycle of one of the said at least two communication buses.

The modification of the duration of the cycle of one of the buses (synchronization) is, for example, proportional to the stored drift.

However, by way of a variant, it is also possible to transmit a command for modifying the duration of the cycle of one of the buses as long as the stored drift is not null.

According to a particular characteristic, the method includes a step of decrementing the absolute value of the stored drift by a value adapted to the modification of the duration of the cycle of one of the said at least two serial communication buses.

This value is thus, for example, proportional to the stored drift in the aforementioned case.

On the other hand, when the stored drift is null, then the method according to the invention makes provision to not institute a step of transmitting a command for modifying the duration of the cycle of one of the buses.

Generally, the characteristics and advantages described for the first embodiment remain the same for the second embodiment.

Correlatively, the invention relates to a device for controlling the synchronization in a data packet communication network having at least two serial communication buses interconnected by a bridge, the said bridge providing the interface between the said at least two serial communication buses, which each define successive time cycles each having a duration specific to the said bus under consideration, the said device having:

means of detecting a relative drift between the respective cycles of the said at least two communication buses, means of transmitting a command for modifying the duration of the cycle of one of the said at least two serial communication buses, characterised in that the said device has means of delaying at least one of the actions of detecting a drift and transmitting a command for modifying the duration of a cycle.

According to one characteristic, the device more particularly has means of delaying an action of transmitting a command for modifying the duration of a cycle.

According to one characteristic, the device more particularly has means of delaying an action of detecting a relative drift between the respective cycles of the said at least two communication buses.

According to one characteristic, the device has means of transmitting a command for modifying the duration of the cycle of one of the said at least two serial communication buses.

The modification is, for example, proportional to the detected drift.

According to a second aspect, the invention relates to a bridge providing the interface between at least two serial communication buses in a data packet communication network, characterised in that the said bridge has a device for controlling the synchronization in this network such as briefly described above.

According to a third aspect, the invention relates to data processing equipment, characterised in that it has a bridge in accordance with the preceding brief description.

The processing equipment is, for example, a printer.

The processing equipment is, for example, a server.

The processing equipment is, for example, a computer

The processing equipment is, for example, a facsimile machine.

The processing equipment is, for example, a scanner.

The processing equipment is, for example, a video recorder.

The processing equipment is, for example, a decoder (known by the term "set top box").

The processing equipment is, for example, a television.

The processing equipment is, for example, a video camera.

The processing equipment is, for example, a digital camera.

The processing equipment is, for example, digital photographic equipment.

According to a fourth aspect, the invention relates to a data packet communication network having at least two serial communication buses interconnected by a bridge, characterised in that the said bridge is in accordance with the above.

According to a fifth aspect, the invention relates to a data communication network having at least two serial communication buses interconnected by a bridge, characterised in that the said network has data processing equipment such as briefly described above.

The invention furthermore relates to an information storage means, possibly totally or partially removable, readable by a computer or a processor containing instructions of a computer program, characterised in that it allows the implementation of the method of controlling the synchronization in a network such as briefly described above.

The invention also relates to an information storage means readable by a computer or a processor containing data resulting from the implementation of the method of controlling the synchronization in a communication network such as briefly described above.

The invention also relates to an interface making it possible to receive the instructions of a computer program, characterised in that it allows the implementation of the method of controlling the synchronization in a network such as briefly described above.

The invention also relates to a computer program product loadable into a programmable device, comprising software code portions for performing the steps of the method of controlling the synchronization in a communication network such as briefly described above when said product is run on a programmable device.

Since the advantages and characteristics specific to the device for controlling the synchronization in a communication network, to the bridge providing the interface between at least two serial communication buses and having such a device, to the data processing equipment having such a bridge, to the said network having such a bridge and to the said network having such data processing equipment, as well as to the information storage means, are the same as those described above concerning the method of controlling the synchronization in a communication network according to the invention, they will not be repeated here.

Other characteristics and advantages will emerge during the description which follows given by way of an illustrative and non-limitative example, and produced with reference to the accompanying drawings in which.

Figure 3:
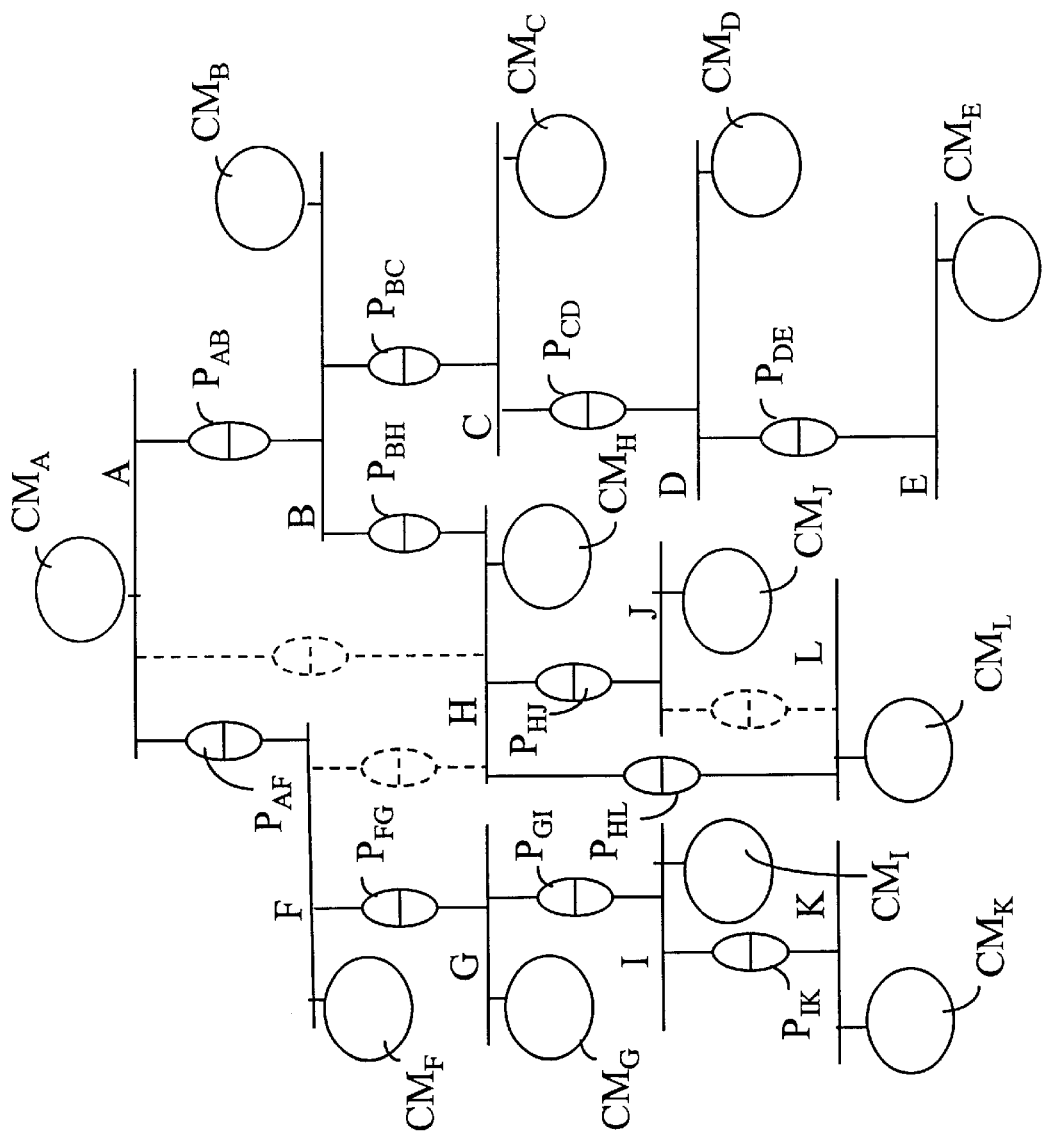
FIG. 3 is a schematic view of a serial communication bus network according to the invention.

As depicted in FIG. 3 and designated by the general reference denoted by 10, a data packet communication network according to the invention has a number of serial communication buses which are, for example, in accordance with the IEEE 1394 standard.

A particular bus in the network is designated as being the upper bus, referred to as the "root" bus, and from which the various other communication buses constituting the branches of a structure with a tree hierarchy extend as far as the buses constituting the ends of the branches and which are referred to as "leaves".

The serial communication buses are identified by the letters A to L in FIG. 3, the bus A being the root bus and the buses E, K and L being the leaf buses.

Each serial communication bus of this network interconnects a number of peripherals such as for example, printers, computers, servers, scanners, video recorders, decoders (known by the term "set top box"), televisions, digital cameras, video cameras, digital photographic equipment, etc.

These peripherals form what are referred to as the nodes of the bus. Each peripheral or node of a bus has an internal clock, not depicted in FIG. 3, from which so-called clock pulses are generated at a so-called clock frequency, for example equal to 24.576 MHz.

Each serial communication bus of the network has a node which is referred to as the "cycle master". The "cycle master" node of the "root" bus is referred to as the "net cycle master". In FIG. 3 only the peripherals referred to as "cycle masters" and denoted by CM are depicted. Thus, the "net cycle master" is denoted by $CM_A$ and the cycle masters of the buses B to L are respectively denoted by $CM_B, \ldots, CM_L$. The organization of these buses as a network involves items of interconnection equipment also referred to as interfaces and which are called bridges.

The serial communication buses A and B are interconnected by a bridge denoted by $P_{AB}$, the serial communication buses denoted by B and C are interconnected by a bridge denoted by $P_{BC}$, the serial communication buses denoted by C and D are interconnected by a bridge denoted by $P_{CD}$, the serial communication buses denoted by D and E are interconnected by a bridge denoted by $P_{DE}$. The serial communication buses B and H are interconnected by a bridge denoted by $P_{BH}$, the serial communication buses denoted by H and J are interconnected by a bridge denoted by $P_{HJ}$ and the serial communication buses denoted by H and L are interconnected by a bridge denoted by $P_{HL}$. The serial communication buses A and F are interconnected by a bridge denoted by $P_{AF}$, the serial communication buses denoted by F and G are interconnected by a bridge denoted by $P_{FG}$, the serial communication buses denoted by G and I are interconnected by a bridge denoted by $P_{GI}$ and the serial communication buses denoted by I and K are interconnected by a bridge denoted by $P_{IK}$.

Figure 4:
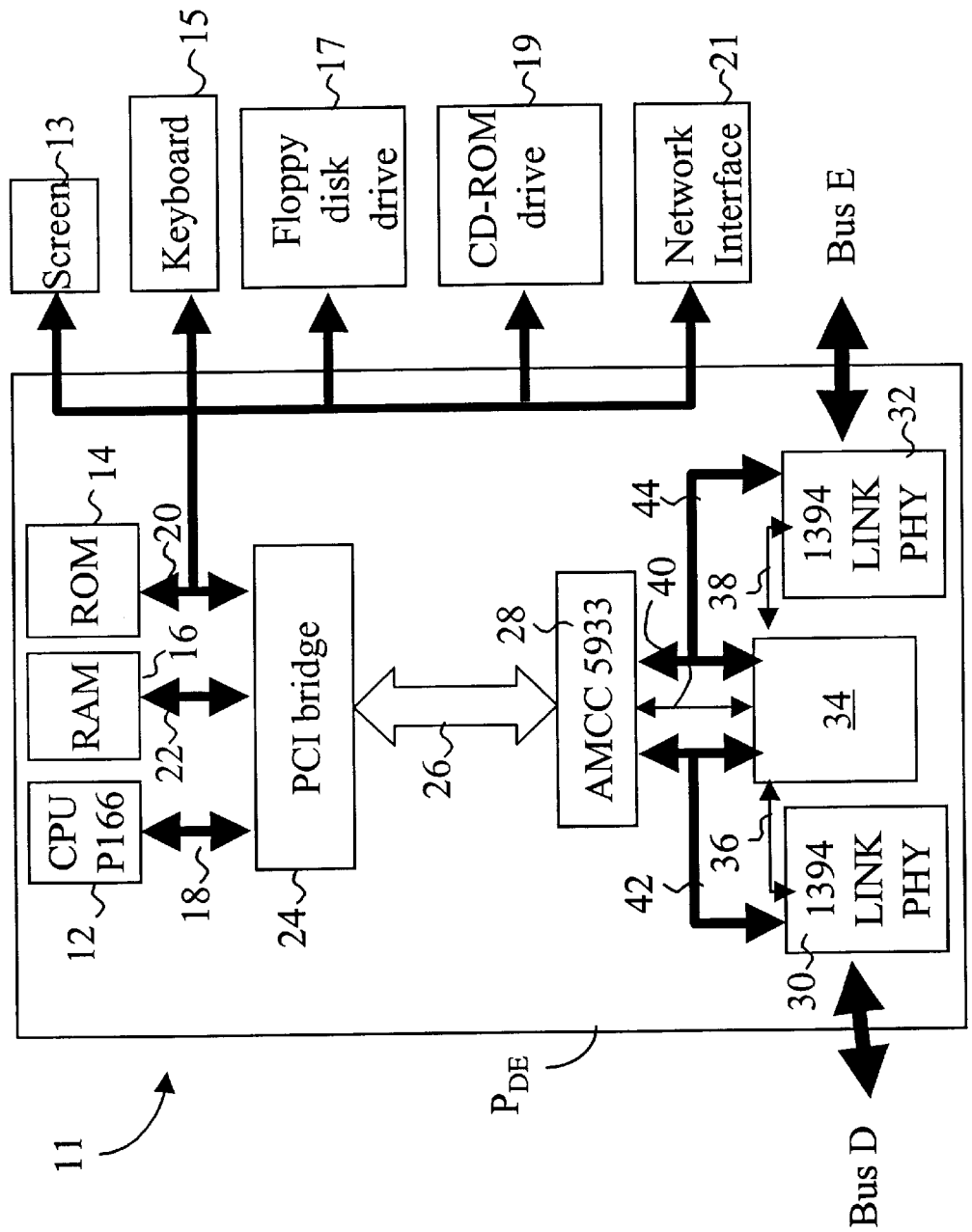
FIG. 4 is a detailed schematic view of the bridge $P_{DE}$ depicted in FIG. 3 according to the invention.

FIG. 4 depicts the schematic structure of an item of data processing equipment such as a computer 11 having the bridge $P_{DE}$. All the bridges of the network depicted in FIG. 3 have for example this structure.

The data processing equipment could also take the form of a printer, a server, a facsimile machine, a scanner, a video recorder, a decoder (known by the term "set top box"), a television, a video camera, a digital camera or digital photographic equipment.

All the bridges of FIG. 3 can for example be integrated into data processing equipment of this type or can constitute the equipment itself.

The bridge $P_{DE}$ constitutes, in this example, a device for controlling synchronization according to the invention between the internal clocks of the "cycle masters" $CM_D$ and $CM_E$. This bridge has an arithmetic unit CPU 12, a permanent storage memory 14 (ROM) which contains the various instructions of the algorithms depicted in FIGS. 6 and 8 and a temporary storage memory 16 (RAM). These three elements 12, 14 and 16 communicate by means of respective address and data buses denoted by 18, 20, 22, with a block denoted by 24 and known to persons skilled in the art by the name PCI bridge.

The computer 11 also has a screen 13, a keyboard 15, a floppy disk drive 17, a CD-ROM drive 19 and a network interface 21 (FIG. 4).

The network interface 21 can receive, for example, by means of an Ethernet type local network (not depicted), the instructions of a computer program allowing the implementation of the method according to the invention.

Such instructions can also be contained in the floppy disk drive or he CD-ROM drive.

The block 24 is in fact a PCI component set such as the intel 440LX AGP set marketed by the INTEL company.

Thus, the block 24 comprises, for example, an 82443LX component which provides the interface with the memory 16 via the memory bus 22 and with the arithmetic unit CPU 12 via the local bus 18. The 82443LX component is itself connected to an 82371AB component which provides an interface with the ISA bus 20 connected to the memory 14 and to the various peripheral extensions: screen 13, keyboard 15, floppy disk drive 17, CD-ROM drive 19 and network interface 21. An Intel 82093AA IOAPIC interrupt controller connected to the arithmetic unit CPU 12 manages the interrupts which may occur in the system.

This block 24 makes it possible notably to exchange data by means of the PCI standard bus 26 (PCI meaning "Peripheral Component Interconnect") with another PCI interface component denoted by 28 The bus 26 can also interconnect other elements, not depicted in the figure, themselves provided with a PCI interface and capable of implementing for example data processing functions.

The component 28 is a component named AMCC5933QC and is marketed by the Applied Micro Circuits Corporation company.

It should be noted that the synchronization control device according to the invention does not necessarily correspond to the bridge itself. It can thus, in fact, represent a sub-assembly thereof formed, for example, from the different elements making it possible to implement the functions of delaying, detection of a drift, storing thereof, comparison with respect to a predetermined threshold and transmission of commands for modifying the duration of the cycle of a bus.

The delay function is implemented by the arithmetic unit CPU 12 and the ROM 14 and RAM 16 memories.

The drift detection function is implemented by the arithmetic unit and the ROM and RAM memories, the logic control block 34 and the components 30, 32.

The function of storing the detected drift and comparison thereof with respect to a predetermined threshold are implemented by the arithmetic unit and the ROM and RAM memories.

The function of transmitting a command for modifying the duration of the cycle of a bus is implemented by the logic control block 34 and the components 30, 32 on command from the arithmetic unit CPU 12.

The bridge depicted in FIG. 4 in addition has two component sets also referred to as blocks 30 and 32 serving respectively as interfaces with the 1394 serial communication buses denoted by D and E in FIG. 3 Each 1394 PHY/LINK component set or block is for example composed of a TSB21LV03A PHY component and a TSB12LV01A LINK component marketed by the Texas instruments company, and 1394 connectors, for example marketed by the Molex company, for example under reference 53462.

Each block denoted by 30, 32 has means of counting the number of pulses generated by the internal clock synchronized with the "cycle master" of the serial communication bus D or E with which it is in contact, by means of Cycle Start packets.

Figure 5:
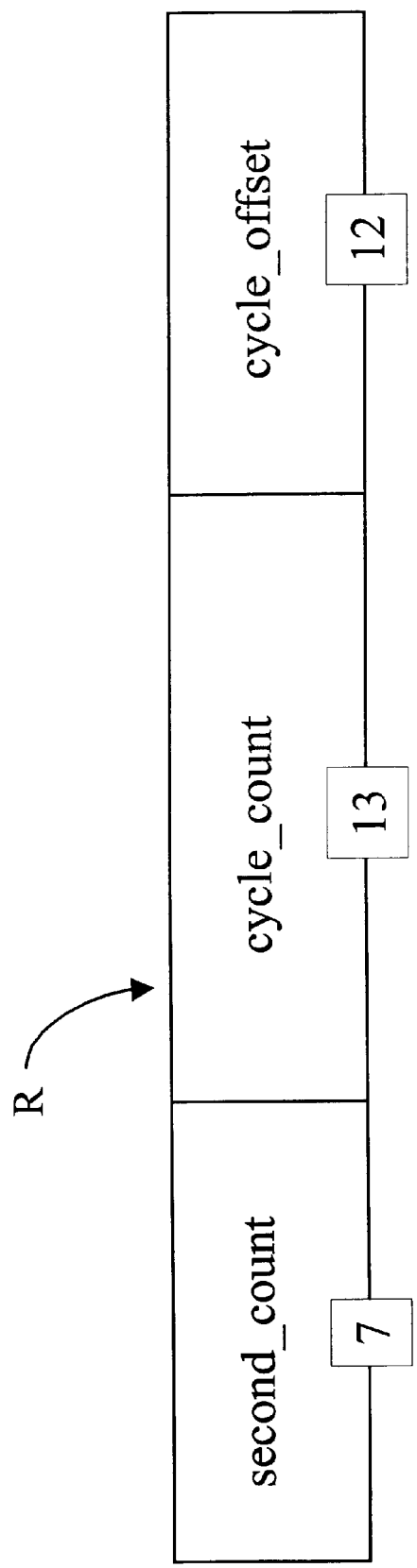
FIG. 5 is a schematic view of a register R included in a 1394PHY/LINK component depicted in FIG. 4.

These counting means come for example in the form of a register such as that depicted in FIG. 5 Such a register, referred to as a "Cycle Time Register", has a number of areas, notably a first area depicted in the right-hand part of FIG. 5 and which is named "cycle_offset". In this first area, which has 12 bits, there is recorded the number of clock pulses $n_{init}$ contained within a cycle specific to the communication bus with which the 1394 PHY/LINK component blocks under consideration are in contact.

In accordance with what has been mentioned previously, up to 3071 clock pulses are counted in this first area. At each pulse of the clock under consideration, the value of this first area of the register is incremented. When the value 3071 is reached and a new clock pulse is counted, the value of the register contained in this first area will change to 0 and a carry will then increment the value of the second area of the register which is situated in the centre of FIG. 5 and is named "cycle_count". This second area totals the number of cycles which have elapsed, up to a number 7999, and is recorded in 13 bits. This second area is incremented each time a carry is generated from the first area "cycle_offset".

However, incrementing by one unit from the value 7999 in this second area of the register R will cause a return to 0 of the value of this area of the register, thus generating a carry which will increment a third area of the register R, situated on the left in FIG. 5 and named "second_count".

The third area "second_count" is recorded in 7 bits. This third area counts the number of times the second area "cycle_count" overflows, up to a value 127. Incrementing by one unit from the value 127 in this third area of the register R then causes a return to 0 of the value recorded in this area.

Additional information about this register R can be found in paragraph 8.3.2.3.1 of the IEEE 1394-95 standard.

The bridge depicted in FIG. 4 also has a logic control block denoted by 34 which can respectively communicate with the component blocks and 32 by means of buses denoted by 36 and 38, as well as with the PCI interface component 28 by means of a bus 40.

Buses and 42 also allow the transfers of data respectively between the PCI interface component 28 and the logic control block 34 as well as the 1394 PHY/LINK component block referenced 30, on the one hand, and, on the other hand, with the logic control block 34 and the 1394 PHY/LINK component block referenced 32.

This logic control block 34 makes it possible to transmit isochronous or asynchronous data packets coming from the serial communication bus D by means of the 1394 PHY/LINK component block denoted by 30 which is associated therewith and to the RAM memory 16, under the control of the DMA ("Direct Memory Access") function which is situated in the PCI interface component 28 and which will have previously been initialized by the arithmetic unit CPU 12.

Conversely, this block 34 also makes it possible to transmit data packets coming from the memory 16 to the other 1394 PHY/LINK block denoted by 32, with a view to its transmission on the serial communication bus E which is associated therewith. This also takes place under the control of the DMA ("Direct Memory Access") function which is situated in the PCI interface component 28 and which will have previously been initialized by the arithmetic unit CPU 12.

The logic control block 34 also makes it possible to trigger a PCI interrupt related to the receiving or sending of a cycle start packet by means of the interface component 28 in order to inform the arithmetic unit CPU 12 of a cycle start. In the same way, the logic control block 34 is capable of generating a PCI interrupt for other types of event such as the receiving or sending of a data packet on the 1394 bus.

The block 34 simultaneously reads the registers R which are situated in each of the components 30 and 32.

The reading of a register included in the logic control block 34 and comprising the respective values, at one and the same instant, of the two registers R ("Cycle Time Register") associated with each 1394 PHY/LINK component block denoted by 30, 32 is available through the PCI interface component 28. Thus, a reading of this register triggers the operation of simultaneous acquisition of the value of the registers R of the components 30 and 32 by the logic control block 34.

Figure 1:
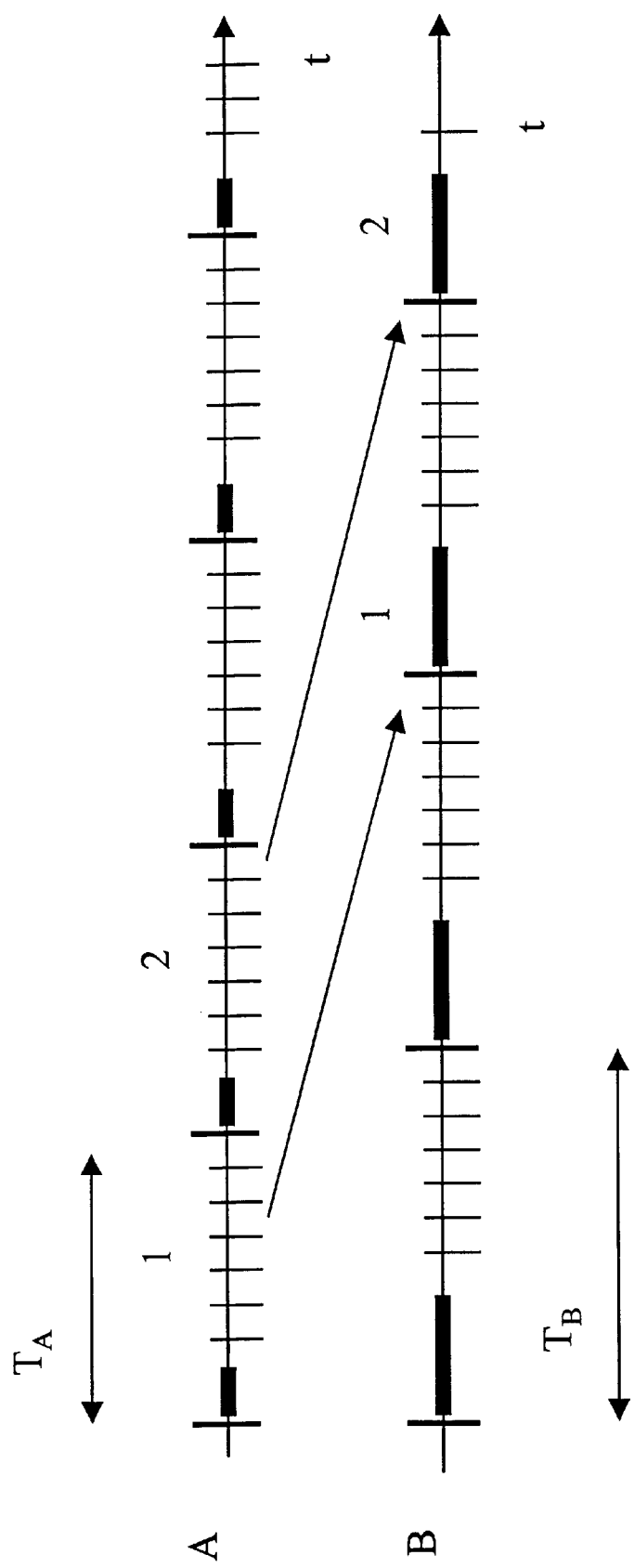
FIG. 1 is a schematic view illustrating the phenomenon of drift between the durations of cycles of the internal docks of the "Cycle Masters" of two serial communication buses connected by a bridge.

Where, with reference to FIG. 1, it is necessary to modify the duration of the cycle of the bus E following the transmission of a synchronization command, the "cycle master" $CM_E$ will modify the duration of the said cycle defined by its internal clock and, at the following cycle, will generate a cycle start message.

The cycle start message is sent to all peripherals connected to the bus E, and therefore to the "portal" of the bridge $P_{DE}$, and will thus allow their synchronization.

The "portal" of the bridge $P_{DE}$ containing the 1394 PHY/LINK component block denoted by 32 will resynchronize itself by modifying the value of its register R.

Modification of the value of the register R is carried out by writing a register of the logic control block 34 via the PCI interface component 28. Writing this register with the information to either bring forward or put back the cycle start tells the logic control block 34 to modify the value of the field "cycle_offset" of the register R of the corresponding PHY/LINK component block.

Moreover, the logic block 34 makes it possible to access the various registers of the component blocks 30 and 32 via the PCI interface component 28.

The logic control block 34 is an FPGA ("Field Programmable Gate Array") type component which is for example marketed by the Xilink company.

Figure 6:
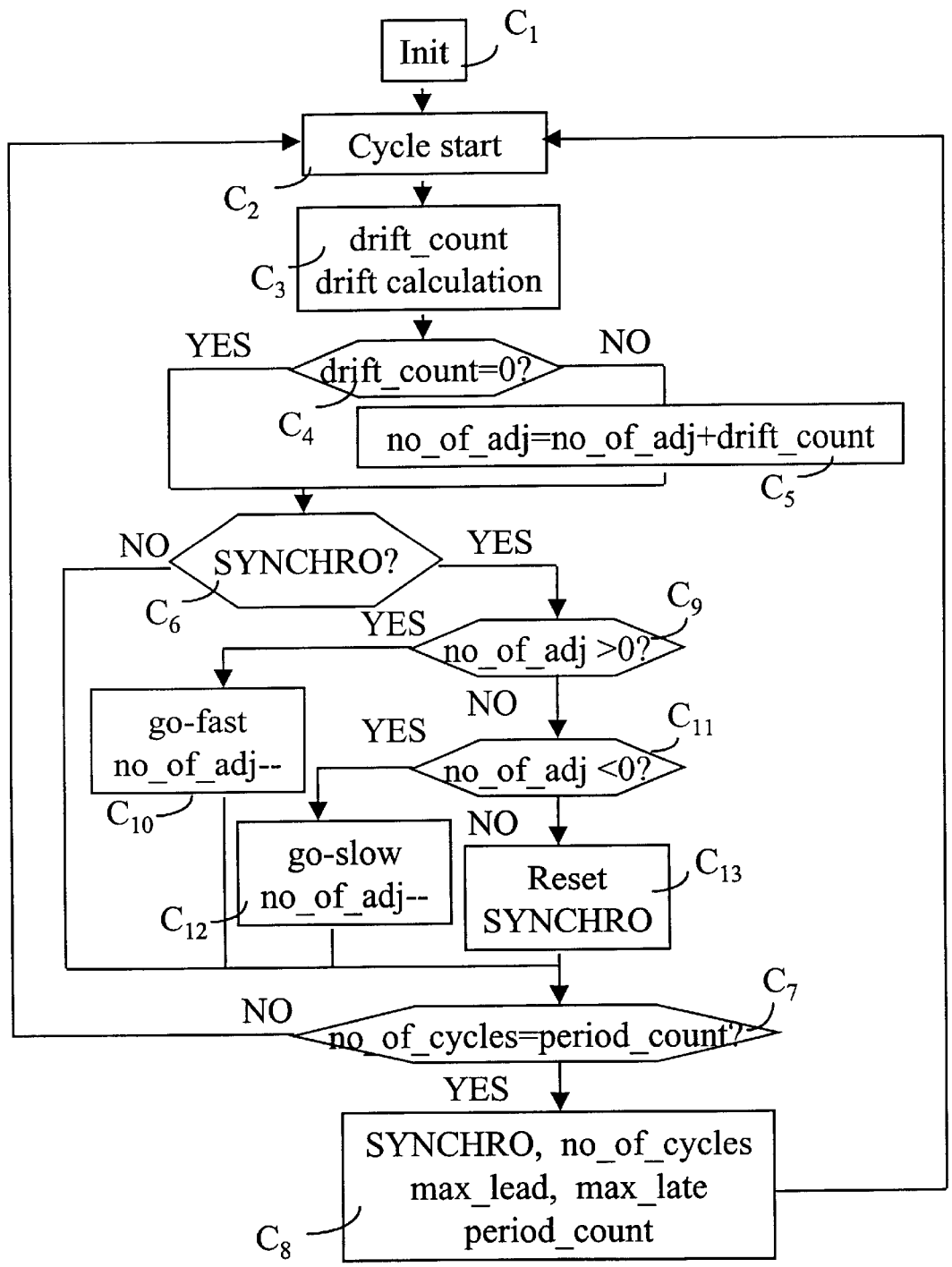
FIG. 6 is a schematic view of an algorithm of the synchronization control method, according to a first embodiment of the invention.

FIG. 6 depicts an algorithm for implementing the method according to a first embodiment of the invention. It is the method of controlling the synchronization between the two serial communication buses connected by the bridge denoted by $P_{DE}$ and for which the different instructions are contained initially in the ROM permanent memory denoted by 14 (FIG. 4).

In accordance with the step denoted by $C_1$ in FIG. 6, an initialization step is provided before the implementation of the method.

Figure 7:
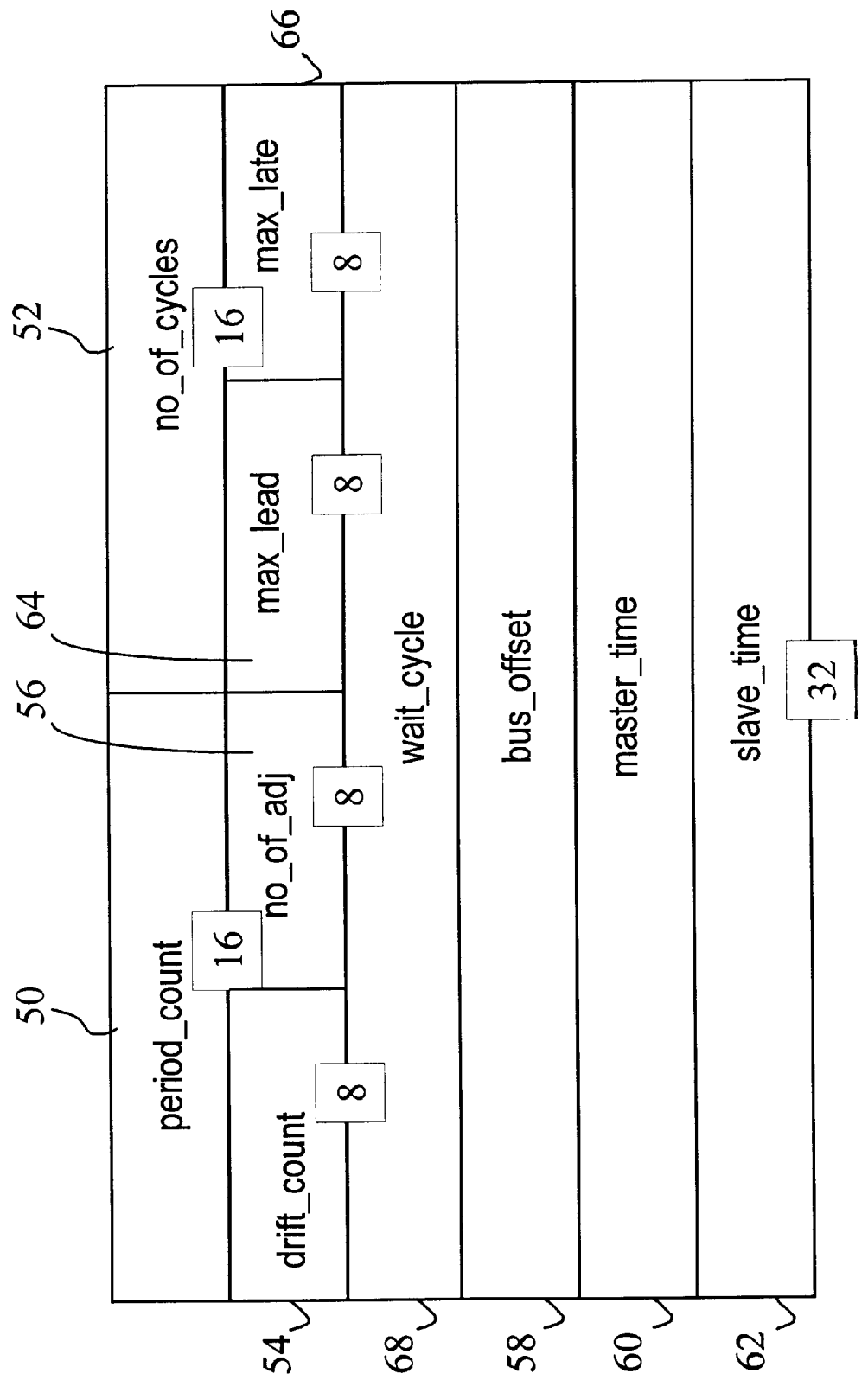
FIG. 7 is a schematic view depicting different registers stored in the RAM memory of FIG. 4.

During this initialization phase, the registers depicted in FIG. 7 are initialized and stored in the memory 16.

A register 50 named "period_count", 16 bits in length, stores the value representing the duration of a so-called measurement period. This measurement period extends over a predetermined number of cycles and is allocated to a particular bridge. The register 50 is initialized with a value which depends on the depth of the bridge in the network structure with a tree hierarchy. Thus, the closer the bridge under consideration is to the "root" bus A, the smaller the value of this measurement period will be. For example, for the bridge $P_{DE}$ the measurement period corresponds to twenty cycles.

According to this logic, the further a bridge is from the "root" bus in the network structure with a tree hierarchy, the longer the duration of the measurement period allocated to the bridge will be.

This is because the Applicant has realized that the bridge $P_{DE}$ in FIG. 3 will receive, for example, according to the prior art a number of commands for modifying the duration of the cycle of the bus E, in view of the fact that drifts will have been noted at the level of the bridges $P_{AB}$, $P_{BC}$ and $P_{CD}$.

So that all these commands propagate as far as the bus E, a certain time is necessary.

To that end, the method according to the invention makes provision just to wait, for the bridge $P_{DE}$, for the elapse of a measurement period also referred to as a "delay phase"

which is longer than for the bridges $P_{AB}$, $P_{BC}$ and $P_{CD}$ before transmitting a command to the bus E. The effect of this delay is that the different drifts which it has been possible to detect at the level of the bridges $P_{AB}$, $P_{BC}$ and $P_{CD}$ balance one another out before reaching the bridge $P_{DE}$, so that it is no longer necessary to transmit a command or, at least, the number of commands to be transmitted is greatly reduced.

Figure 2:
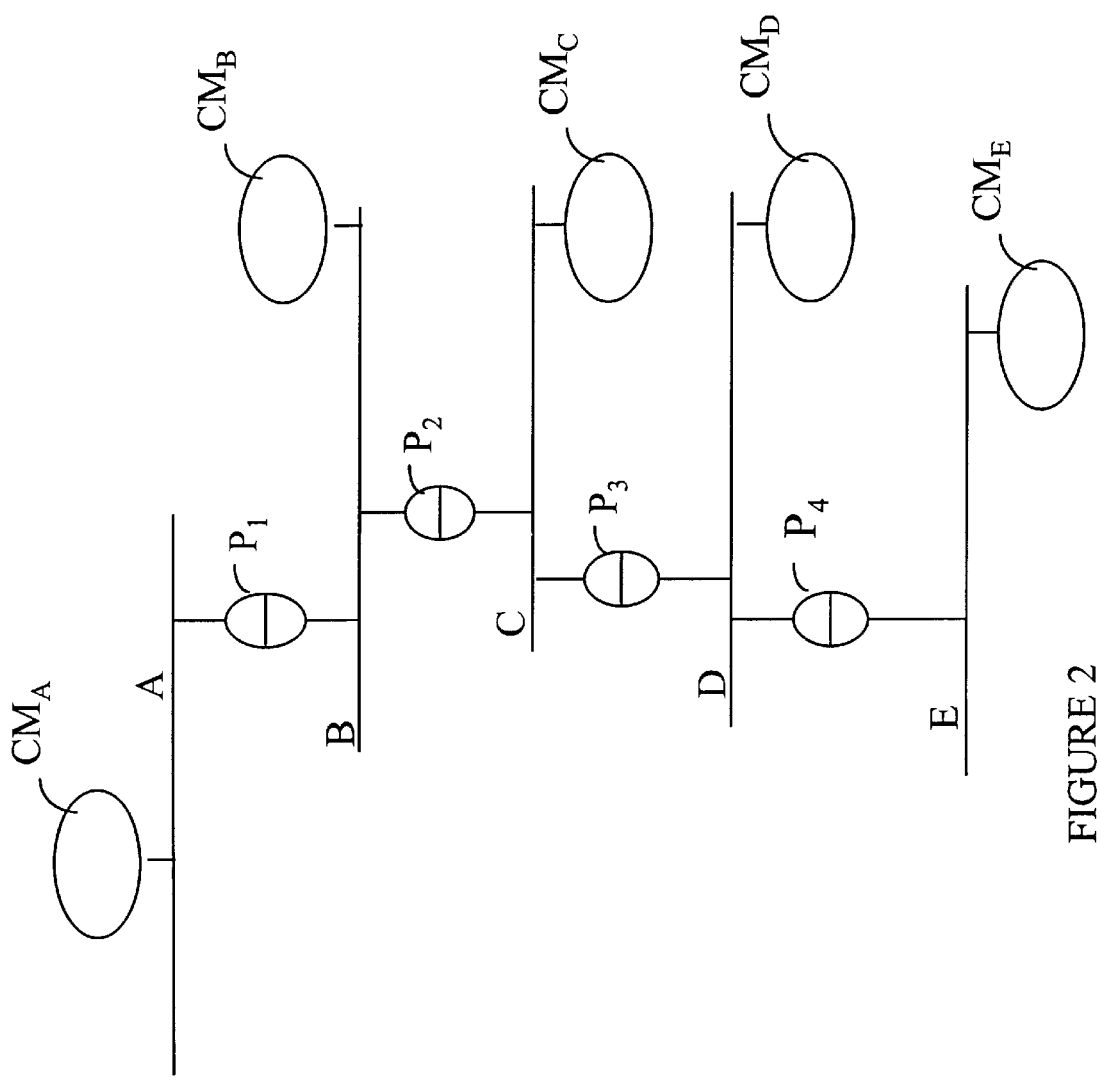
FIG. 2 is a schematic view of a serial communication bus network according to the prior art.

If the example of the prior art described with reference to FIG. 2 is taken again, with the following observations: there will be one cycle too many every four cycles between the buses denoted by A and B, one cycle will be lost every eight cycles between the buses denoted by B and C, no drift is detected between the cycles of the buses denoted by C and D and one cycle will be lost every eight cycles between the buses denoted by D and E, then two conflicting commands will arrive at the "cycle master" $CM_E$, one "go slow ¼", requesting the start of the cycle of the bus E to be put back, on average by one unit one cycle out of four, and the other "go fast ¼", requesting the start of the cycle of the bus E to be brought forward, on average by one unit one cycle out of four.

By virtue of the invention, the different drifts which occur over time balance one another out during the delay phase and it is then no longer necessary to transmit any commands to the " Cycle Master" $CM_E$, contrary to what happens in the prior art A register denoted by 52 in FIG. 7, 16 bits in length, indicates the number of cycles which have elapsed since the start of the measurement period. This register named "no__of__cycles" is initialized to 0.

A register denoted by 54, 8 bits in length, indicates the relative rift between the cycles of the two adjacent serial communication buses which are interconnected by the bridge in question. This register named "drift_count" is initialized to 0.

This drift corresponds to the instantaneous drift which is detected between the cycles of the two serial communication buses.

A register denoted by 56 and named "no_of_adj", 8 bits in length, indicates the stored drift between the two serial communication buses under consideration since the start of the measurement period. This register is initialized to 0.

A register denoted by 58 and named "bus_offset", 32 bits in length, represents the constant phase displacement between the cycles of two adjacent serial communication buses interconnected by a bridge.

This constant phase displacement corresponds to the maximum processing time allocated to the bridge for processing a packet which passes through it. It is controlled through a queue whose depth, in terms of isochronous packet capacity, defines the duration of this phase displacement.

The internal structure of such a register is the same as that of the register R depicted in FIG. 5. The first area of the register 58 named "cycle_offset" must have a value equal to 0 for this register. A minimum value of 2 for the second area of this register 58 named "cycle_count" is required at the time of initialization. As for the value of this second area of the register, it must remain constant. This means that the constant phase displacement between two buses, expressed as a number of whole cycles, is 2 at minimum.

If, for example, the example of the bridge denoted by $P_{DE}$ depicted In FIG. 4 is taken, it is noted that the 1394 PHY/LINK component block referenced 30 is in contact with the serial communication bus D whose "cycle master" $CM_D$ is referred to as the "master" in a "master/slave" relationship while the 1394 PHY/LINK component block referenced 32 is in contact with the communication bus E whose "cycle master" $CM_E$ is referred to as the "slave".

A register denoted by 60 and named "master_time" in FIG. 7 contains a value of the register R depicted in FIG. 5 and which belongs to the 1394 PHY/LINK component block denoted by 30 in FIG. 4. The value of the register R of this block 30 is situated in the register 60 when a detection of the drift between the cycles of the two buses is carried out. The internal structure of the register 60 is the same as that of the register R depicted in FIG. 5. This register is initialized to 0.

A register referenced 62 in FIG. 7 and named "slave_time" contains the value of the register R depicted in FIG. 5 and which belongs to the 1394 PHY/LINK component block denoted by 32 in FIG. 4, when the register R of the block 30 had the value stored in the register "master_time" denoted by 60. The internal structure of this register is also the same as that of the register R of FIG. 5. This register is initialized to 0.

Two other registers 64 and 66 shown in FIG. 7 are not used in this first embodiment of the invention but will be used in a variant embodiment which will be described later with reference to FIG. 8.

Figure 10:
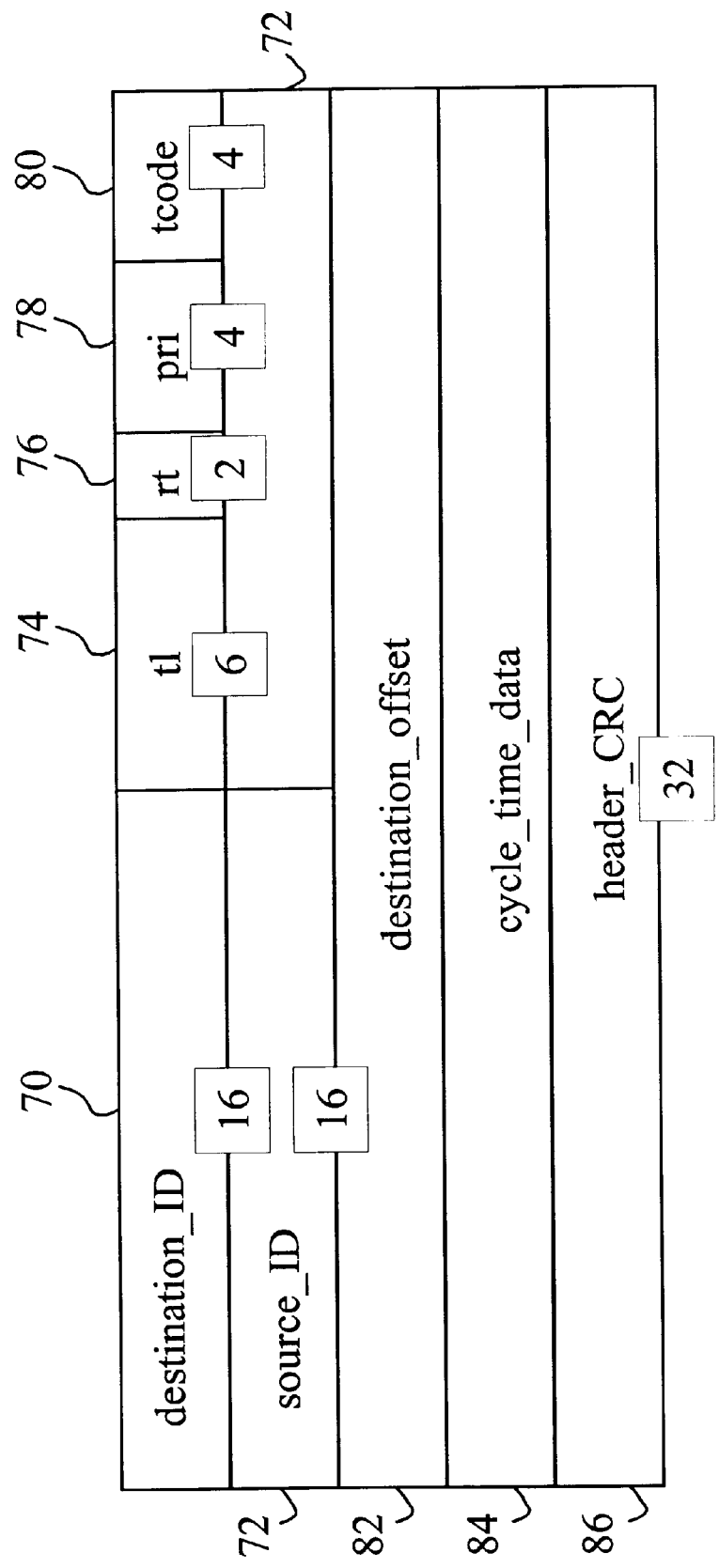
FIG. 10 is a schematic view depicting the structure of a cycle start packet.

Returning to FIG. 6, the method of controlling the synchronization between the serial communication buses D and E of FIG. 3 has a step denoted by $C_2$ consisting of waiting for the start of a cycle (a "cycle start") which will be initialized by sending a cycle start packet. The structure of such a packet is depicted in FIG. 10 and will be described later.

When such a cycle start packet is sent, the step $C_2$ is followed by a step $C_3$. The arithmetic unit 12 (CPU) then increments the register 52 named "no_of_cycles" and gives the order to the logic block 34 to simultaneously read the registers R of each of the components 30 and 32 of the bridge $P_{DE}$ depicted in FIG. 4 and to initialize respectively, with the values read, the registers "master_time" 60 and "slave_time" 62 in the RAM memory 16.

A comparison between the first two areas named "cycle_offset of the registers 60 and 62 during the step $C_3$ reveals the number of pulses $n_{init}$ extra or short in one of other of these registers and therefore makes it possible to determine the relative drift between the cycles of the internal clocks of the "cycle masters" $CM_D$ and $CM_E$.

This value of the instantaneous drift is written into the register "drift_count" 54 of FIG. 7.

Once this comparison has been carried out, the step $C_4$ of the synchronization control method according to the invention allows the value of the drift to be examined.

Execution of the steps $C_3$ and $C_4$ of the algorithm makes it possible to perform the function of detecting a relative drift between the cycles of the internal clocks of the "cycle masters" of the serial communication buses D and E.

If this value is different from 0, then the step $C_4$ is followed by a step $C_5$ during which the relative drift which has just been detected is stored in the register 56 of FIG. 7. In practice, this drift corresponds to a clock pulse of difference between the values of the areas "cycle_offset" of the registers 60 and 62.

In the register 56, the drift which has just been detected during a given cycle is more precisely summed with the successive drifts which have been detected previously during the preceding cycles and stored in the said register.

It should be noted that, in the algorithm depicted in FIG. 6, the operation of storing the drift is carried out at the same time (step $C_5$) as the operation of summing this drift with those stored earlier.

However, in a variant not depicted in the figures, it would be possible to carry out only a storing operation with no summing, provided, nevertheless, that a digital processing is applied, related to the change over time of the variations in the drift detected at the level of the bridge over a number of successive cycles in order to better manage the transmission of commands for modifying the cycle duration.

The step $C_5$ is next followed by the step $C_6$ during which a test is performed on a Boolean variable called SYNCHRO. If the instantaneous drift written into the register "drift_count" $S_4$ is null, then the step $C_5$ is followed directly by the step $C_6$.

The test consists of checking whether the Boolean variable named SYNCHRO is true.

During the course of the first measurement period, the Boolean value SYNCHRO is set to the value "false" and the step $C_5$ is followed by the step $C_7$.

The step $C_7$ of the method according to the invention next performs a test in order to ascertain whether the measurement period is finished.

In the case illustrated here, where the algorithm loop corresponds to the progression of the first cycle of the measurement period, the latter is not finished. The step $C_7$ is then followed by the steps $C_2$, $C_3$, $C_4$, $C_5$, $C_6$ and $C_7$, if a drift is detected during the following cycle, or the steps $C_2$, $C_3$, $C_4$, $C_6$ and $C_7$, if no drift is detected. The execution of the steps $C_2$ to $C_7$ is performed as many times as there are cycles in the measurement period of the bridge under consideration. For the bridge $P_{DE}$, these steps are executed twenty times.

When the measurement period is finished, then the step $C_7$ is followed by the step $C_8$ during which the Boolean value SYNCHRO is set to the value "true" and the register named "no_of_cycles" referenced 52 in FIG. 7 is re-initialized to "0".

The step is $C_8$ followed by the step $C_2$ when a new cycle start packet is sent.

The steps $C_3$ to $C_6$ are next executed, if a drift is detected, or the steps $C_3$, $C_4$ and $C_6$, if no drift is detected.

During execution of the step $C_6$, a test is performed on the Boolean variable SYNCHRO.

As the variable has the value "true" in this case, then the step $C_6$ is followed by the step $C_9$ during which it is examined whether the value of the drift stored during the cycles of the previous measurement period is positive.

In the affirmative, in accordance with the step $C_{10}$, a command with a view to reducing the duration of the cycle of the serial communication bus E is transmitted to the "cycle master" $CM_E$.

During this step there is also carried out a decrementing (no_of_adj−) of the absolute value of the stored drift no_of_adj by a value which is adapted to the modification of the duration of the cycle of the bus E transmitted to the "cycle master" $CM_E$.

The step $C_{10}$ can thus be repeated a number of times until the stored drift is null.

In order to transmit, to the "cycle master" of the bus E, a command for modifying the duration of the cycle of the said bus, the arithmetic unit 12 formats a data packet which will contain the command and initializes it in the memory 16. The unit 12 first initializes the logic control block 34 for sending the packet, and then the direct memory access function of the component 28. The direct memory access thus takes care of transferring the formatted data packet containing the cycle duration modification command into an internal memory, not depicted, of the block 32, via the logic control block 34.

Finally, the logic control block 34 commands the block 32 to transmit the packet on the bus E.

If the value of the stored drift is not positive then the step $C_9$ is followed by the step $C_{11}$ during which it is examined whether this value is negative.

In the affirmative, a command with a view to increasing the duration of the cycle of the serial communication bus E is transmitted to the "cycle master" $CM_E$ in accordance with the step $C_{12}$ of the algorithm of FIG. 7.

In a manner similar to what been described with reference to the step $C_{10}$, an adapted decrementing (no_of_adj++) of the absolute value of the stored drift is also carried out and this step $C_{12}$ can be repeated until the stored drift is null. In the negative, this means that the stored drift is null and the step $C_{11}$ is followed by a step $C_{13}$ during which the Boolean value SYNCHRO is set to the value "false". It should be noted that this means that the serial communication buses D and E are synchronized again and that the drift is null.

When the stored drift is null, this means either that there was no drift detected during the measurement period which elapsed previously, or that the various drifts which were detected have balanced one another out.

The fact of keeping in the register 54 "drift_count" of the RAM memory all the drifts detected during a measurement period makes it possible to know whether no drift was actually detected or whether they all balanced one another out.

In the embodiment which has just been described, the measurement period which extends over twenty cycles corresponds to a so-called delay phase. The repeated execution of the steps $C_2$ to $C_7$ of the method according to the invention makes it possible to perform this delay function.

During this delay phase, in accordance with the invention, no command with a view to modifying the duration of the cycle of the serial communication bus E is transmitted as long as the phase has not reached its conclusion.

Figure 8:
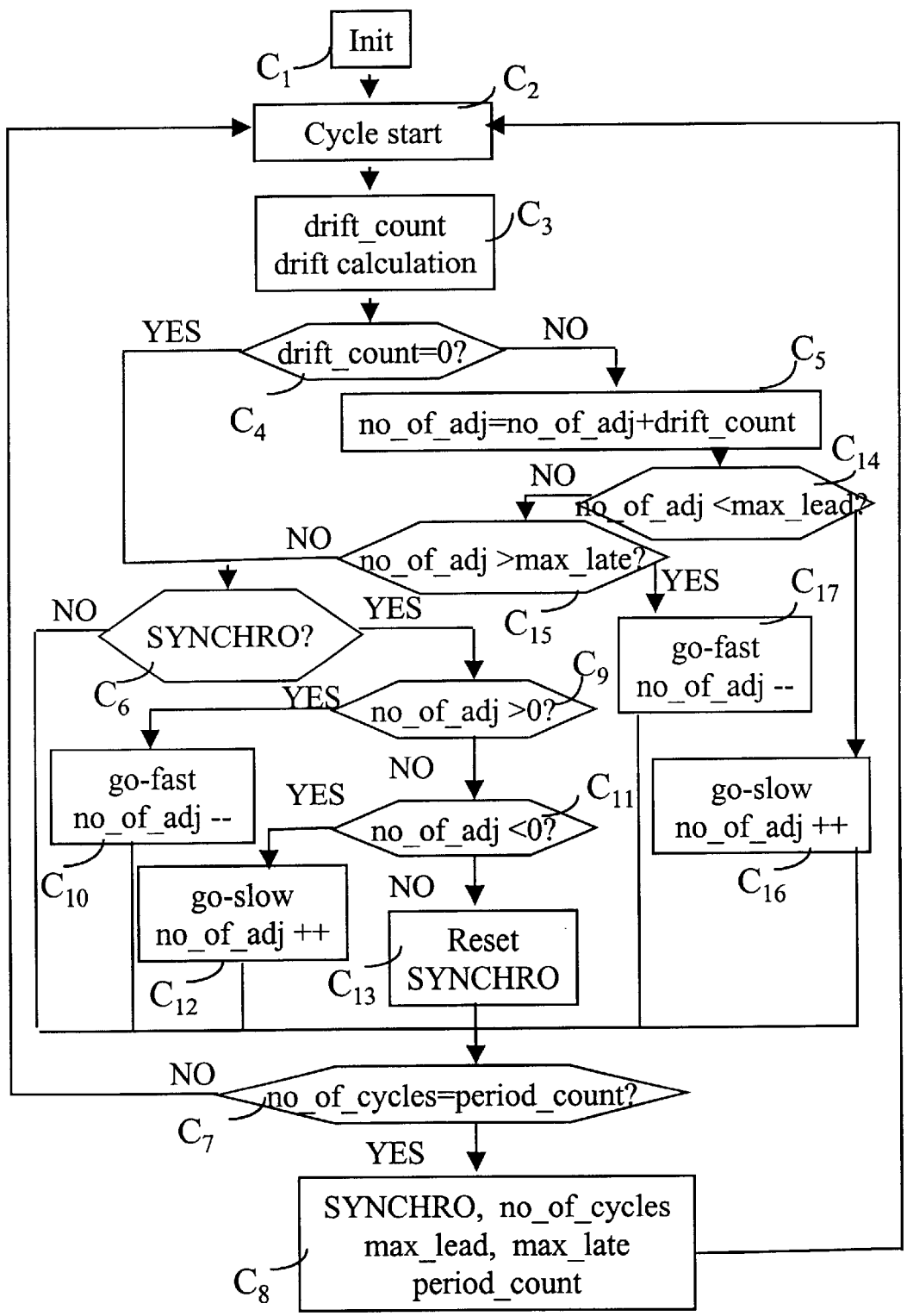
FIG. 8 is a schematic view of an algorithm of the synchronization control method according to a variant of the first embodiment of the invention depicted in FIG. 6.

FIG. 8 illustrates a variant of the first embodiment of the invention involving the same steps $C_1$ to $C_{13}$ as those depicted in FIG. 6 and which will therefore not be detailed below.

In this variant embodiment, the delay phase, which previously always corresponded to the measurement period of the bridge under consideration, corresponds either to this measurement period if the delay phase has not expired beforehand, or to an unforeseen number of cycles less than the number of cycles corresponding to the measurement period.

In accordance with the algorithm of FIG. 8, when the steps $C_1$ to $C_5$ have been executed, as just explained with reference to FIG. 6, during the first cycle of the measurement period, the following step $C_{14}$ is gone to.

The step $C_{14}$ consists of comparing the stored drift in the register 56 with a predetermined threshold recorded in a register 64.

The register denoted by 64 depicted in FIG. 7, 8 bits in length, corresponds to a negative value for the drift. This register named "max_lead" is Initialized to the value "−128".

During the first cycle, given that it concerns the first drift which is detected, the stored drift (plus or minus one pulse) is always greater than the value contained in the register "max_lead" 64.

The value of this register this chosen as a function of the stored drift during the preceding measurement periods and is for example set to a value half the value of the register "no_of_adj" 56 at the start of the preceding synchronization phase if the value of the register 56 is negative.

In the aforementioned case, the step $C_{14}$ is followed by the step $C_{15}$ during which the stored drift is compared with a predetermined threshold recorded in the register 66 of FIG. 7.

This register named "max_late", 8 bits in length, corresponds to a maximum positive value for the drift and is initialized to the value "+128".

The value of this register is chosen as a function of the stored drift during the preceding measurement periods. This value is for example set to a value half the value of the register "no_of_adj" 56 at the start of the preceding synchronization phase if the value of the register 56 is positive.

There again, the stored drift during this first cycle of the measurement period does not reach the threshold concerned and the step $C_{15}$ is followed by the steps $C_6$ and $C_7$, then a second cycle start packet is generated (step $C_2$) and the aforementioned steps are again executed. As long as the thresholds contained in the registers "max_lead" 64 and "max_late" 66 of FIG. 7 are not crossed, the steps $C_{14}$ and $C_{15}$ therefore always lead to the steps $C_6$ and $C_7$ and the measurement period elapses without any command for modifying the duration of the cycle of the bus E having been transmitted.

The case described with reference to FIG. 6 is then returned to and the delay phase is equal to the measurement period.

On the other hand, if drifts are detected frequently and do not balance one another out, then the steps $C_{14}$ and $C_{15}$ will have a function.

Let it be assumed, for example, that, after a number of elapsed cycles of one and the same measurement period, the successively detected drifts lead to a stored drift in the step $C_5$ and contained in the register "no_of_adj" 56 of FIG. 7 which is less than the value contained in the register "max_lead" (step $C_{14}$).

For this reason, the transmission of a command with a view to increasing the duration of the cycle of the internal clock of the "cycle master" $CM_E$ of the serial communication bus E must take place without waiting for the end of the measurement period and the step $C_{14}$ is then followed by the step $C_{16}$.

This will allow notably the bus E to avoid accumulating lead with respect to the bus D, beyond a threshold defined as a function of the previously observed drift.

Thus, the delay phase provided by the invention has, in this precise case, a duration less than that of the measurement period and which corresponds to the number of cycles which have elapsed since the start of the said measurement period up to the cycle during which it is realized that the threshold contained in the register "max_lead" has been crossed.

Let it now be assumed that, after a number of elapsed cycles of one and the same measurement period, the successively detected drifts lead to a stored drift in the step $C_5$ which is greater than the value contained in the register max_late" (step $C_{15}$).

For this reason, the transmission of a command with a view to reducing the duration of the cycle of the internal clock of the "cycle master" $CM_E$ of the serial communication bus E must take place without wafting for the end of the measurement period.

This will allow notably the bus E to avoid summing lead with respect to the bus D, beyond a threshold defined as a function of the previously observed drift.

The step $C_{15}$ is then followed by the step $C_{17}$.

It should be noted that, during each step $C_{15}$, $C_{17}$, there is carried out a decrementing (no_of_adj++ or no_of_adj–) of the absolute value of the stored drift by a value which is adapted to the modification of the duration of the cycle of the bus E. Each step can thus be repeated until the stored drift is null.

Thus, the delay phase provided by the invention has, in this precise case, a duration less than that of the measurement period and which corresponds to the number of cycles which have elapsed since the start of the said measurement period up to the cycle during which it is realized that the threshold contained in the register "max_late" has been crossed It should be noted that the modification of the cycle duration could be proportional to the stored drift which would have the advantage of not having a number of commands to be transmitted consecutively.

It is also necessary to note that, when a drift is detected at the level of the bridge $P_{DE}$, the command transmitted after the delay phase aims to modify the duration of the cycle of the bus E.

However, modifying the duration of the cycle of the bus D instead of that of the bus E could be entirely envisaged if the network hierarchy were to reverse the sense of the master/slave relationships between the buses D and E.

Figure 9:
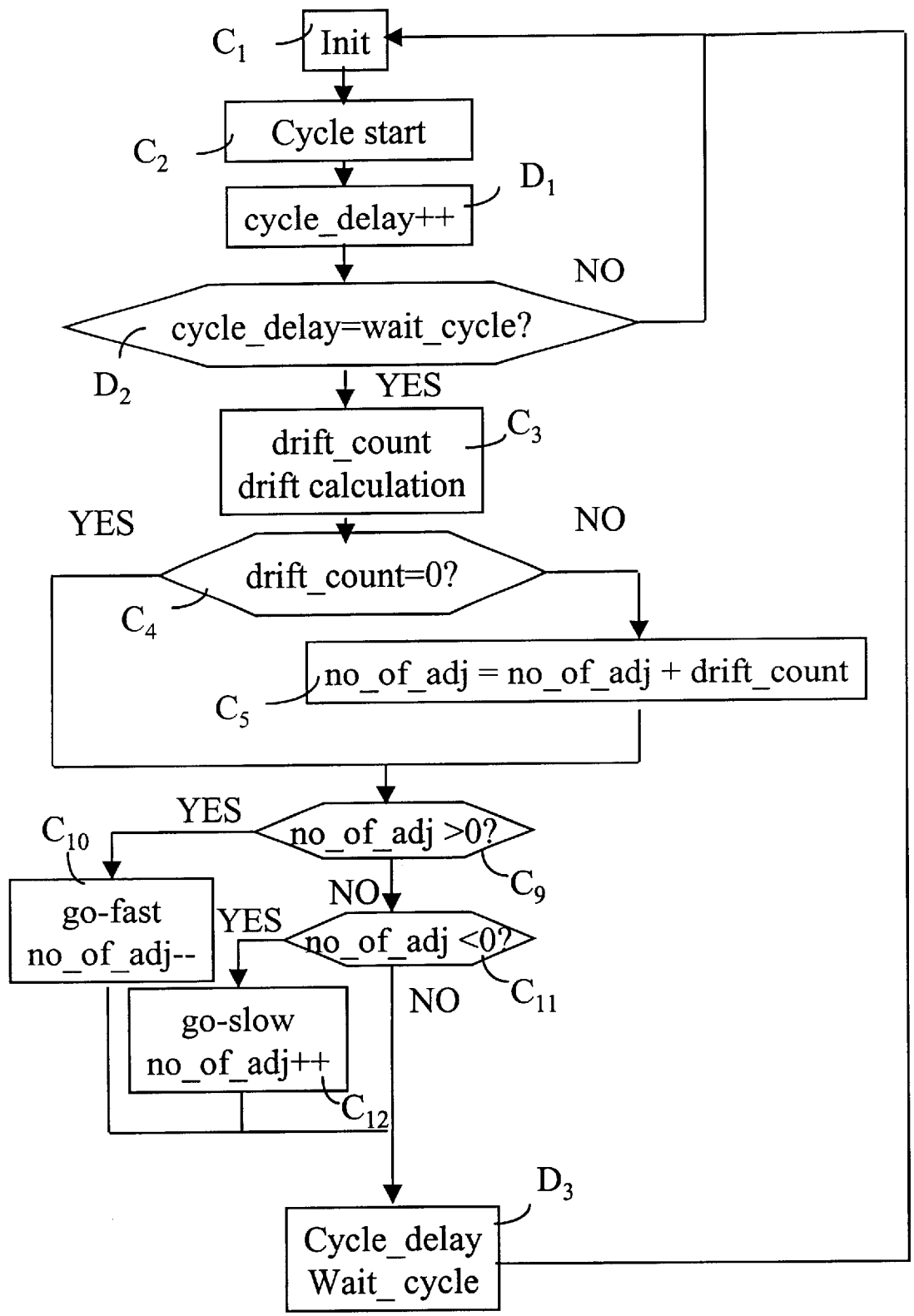
FIG. 9 is a schematic view of an algorithm of the synchronization control method, according to a second embodiment of the invention.

FIG. 9 illustrates a second embodiment of the invention.

This figure depicts an algorithm for implementing the method of controlling the synchronization between the serial communication buses D and E. The algorithm differs from that of FIG. 6 notably by three new steps D1, D2 and D3. The steps which remain unchanged compared with those of FIG. 6 keep the same references.

The different instructions of this algorithm are initially contained in the ROM permanent memory denoted by 14 of the computer 11 comprising the bridge $P_{DE}$ (FIG. 4).

In accordance with the step $C_1$, identical to that of FIG. 6, an initialization step is provided during which the registers depicted in FIG. 7 are initialized and stored in the RAM memory 16.

Similarly, two new registers named "cycle_delay" and "wait_cycle", not depicted in the figures, specific to this second embodiment, are also initialized and stored in the RAM memory 16.

The register "cycle_delay", 32 bits in length, stores the value representing the number of cycles which follow one another during one delay phase.

The register "wait_cycle", 32 bits in length, stores the Maximum value of the number of cycles contained in one delay phase.

This register is depicted in FIG. 7 and has the reference 68.

In a manner identical to the description produced with reference to FIG. 6, the method includes a step $C_2$ which consists of waiting for the sending of a cycle start packet.

The method next has a step $D_1$ during which the register "cycle_delay" is incremented by one cycle.

The step D1 is followed by a step $D_2$ which consists of comparing the value of the register "cycle_delay" with that of the register "wait_cycle" in order to determine whether the predetermined number of cycles contained in the latter has been reached.

When this number has not been reached, the steps $C_2$, $D_1$ and $D_2$ are repeated as many times as necessary.

The succession of these steps over time illustrates the delay phase which takes place before an action of detecting a relative drift between the cycles of the buses D and E is undertaken.

This delay phase has a duration which is calculated as a function of the earlier delay phases specific to the bridge $P_{DE}$ and as a function of the observations made on the value of the drifts occurring during successive cycles.

If the drifts which have occurred during successive cycles have had little tendency to balance one another out, then the delay phase will be shorter than if these drifts balanced out "naturally".

By virtue of this delay phase, a saving is in fact made on drift detection steps which re not necessary as long as the drift has not reached a crippling value.

The duration of the delay phase is such that the detection step which follows it is, on the other hand, necessary to make sure that the drift is not too large.

The drift detection step is carried out during the steps $C_3$ and $C_4$ already described with reference to FIG. 6.

Only the value of the detected drift is, on the other hand, different from that detected during the algorithm of FIG. 6

This is because. In the algorithm of FIG. 6, only a difference of one clock pulse is detected whereas a number of clock pulses can be detected in the algorithm of FIG. 9.

If a drift is detected, this is stored during a step $C_5$ identical to that of FIG. 6.

It should be noted however that this storing step can be omitted, the detected drift of one step being capable of giving rise directly to the transmission of one or more synchronization commands.

The step $C_5$ is next followed by the steps $C_9$, $C_{10}$, $D_3$ or $C_9$, $C_{11}$, $C_{12}$, $D_3$ in the case where a positive or negative drift has been detected.

These steps are identical to those having the same references in FIG. 6.

It should be noted that a number of successive synchronization commands can be transmitted if the need arises during the steps $C_{10}$, $C_{12}$.

If no drift is detected, the step $C_4$ is followed by the steps $C_9$, $C_{11}$ and $D_3$.

During the step $D_3$, the register "cycle_delay" is reset to zero and the value of the register "wait_cycle" is refined as a function of the progression of this algorithm.

According to a variant not depicted in the figures, a delay phase occurs (a series of triplets of steps $C_2$, $D_1$ and $D_2$), steps of detecting and storing (summing) the drift take place, and the stored drift is compared with a predetermined threshold in a manner identical to the steps $C_{14}$ and $C_{18}$ of the algorithm of FIG. 6.

If this drift exceeds the thresholds "max_lead" or "max_late" then one or more synchronization commands are transmitted (steps $C_{16}$, $C_{17}$).

In the contrary case, a new delay phase occurs (a series of triplets of steps $C_2$, $D_1$ and $D_2$), as well as steps of detecting and storing the drift. During the storing step, the value of the drift is summed with that stored previously.

These two drifts may balance out or add up and, depending on the result of the summing and its comparison with the thresholds, this will give rise to one or more synchronization command transmissions, or perhaps even none in the case of total balancing out.

According to another variant embodiment, not depicted, a first delay phase occurs in accordance with the repetition over time of the triplet of steps $C_2$, $D_1$ and $D_2$ (FIG. 9), and a drift detection step is carried out (steps $C_3$ and $C_4$ of FIG. 9).

Steps of storing the detected drift and comparing with two predetermined thresholds are next carried out in a manner identical to the steps $C_5$, $C_{14}$ and $C_{15}$ of FIG. 8.

If these thresholds have not been crossed, a second delay phase along the lines of the algorithm of FIG. 8 occurs before any synchronization command transmission action. The steps $C_2$, $C_3$, $C_4$, $C_5$, $C_6$, $C_{14}$, $C_{15}$ and $C_{17}$ are then repeated when drifts are detected but the thresholds have still not been crossed.

At the end of the conclusion of the measurement period (a predetermined number of cycles corresponding to the duration of the second delay phase) or at the end of a number of cycles less than that contained in the said measurement period when the stored drift crosses one of the thresholds, then one or more synchronization commands are transmitted.

Advantageously, the addition of the second delay phase after detection of the drift of following upon the first delay phase makes it possible to increase the frequency of detecting the drift and therefore to more efficiently monitor the change thereof.

This case is of interest when the detected drift after the first delay phase provides a value which is sufficiently high but not crippling to the point of it having to be mandatory to transmit a synchronization command.

As previously mentioned during the description produced with reference to FIG. 6 and, more particularly, at the step $C_2$, a cycle start packet has a structure which is depicted in FIG. 10.

Detailed information on the cycle start packet is found in paragraph 6.2.2.2.3 of the IEEE 1394-95 standard.

The cycle start packet whose structure is depicted in FIG. 10 is generated on a serial communication bus by the "Cycle Master" of the bus under consideration.

As depicted in this figure, the cycle start packet has a first field denoted by 70 and named "destination_ID", 16 bits in length, which has the data identifying the nodes or peripherals of the bus for which this packet is intended.

The packet also has a field denoted by 72 and named "source_ID", 16 bits in length, which contains the data identifying the " Cycle Master" generating the said packet.

The cycle start packet has a field denoted by 74 and named "tl", 6 bits in length, corresponding to the transaction label, which contains the value '000000' in binary representation.

The cycle start packet has a field denoted by 76 and named "rt", 2 bits in length, corresponding to the retry code and which contains the value '00' in binary representation.

The cycle start packet has a field denoted by 78 and named "pri", 4 bits in length, identifying a priority and which contains the value '1111' in binary representation.

The cycle start packet has a field denoted by 80 and named "tcode", 4 bits in length, corresponding to the transaction code and which contains the value '8' in decimal representation.

The packet also has a field denoted by 82 and named "destination_offset", 16 bits in length, and which contains the standard address of the register CYCLE_TIME as specified in the standard and which is '200' in hexadecimal representation.

The cycle start packet has a field denoted by 84 and named "cycle time_data", which includes the content of the cycle time register, this register denoted by R being depicted in FIG. 5.

For more information concerning this field, reference can be made to paragraph 8.3.2.3.1 of the IEEE 1394-95 standard.

The cycle start packet also has a field denoted by 86 and named "header_CRC", 32 bits in length, and whose content is calculated in the manner indicated in paragraph 6.2.4.15 of the IEEE 1394-95 standard.

It should be noted that a cycle start packet will be recognized by the destination nodes if the field named "tcode" and denoted by 80 is equal to 8 and if the field "header_CRC" is valid.

Figure 11:
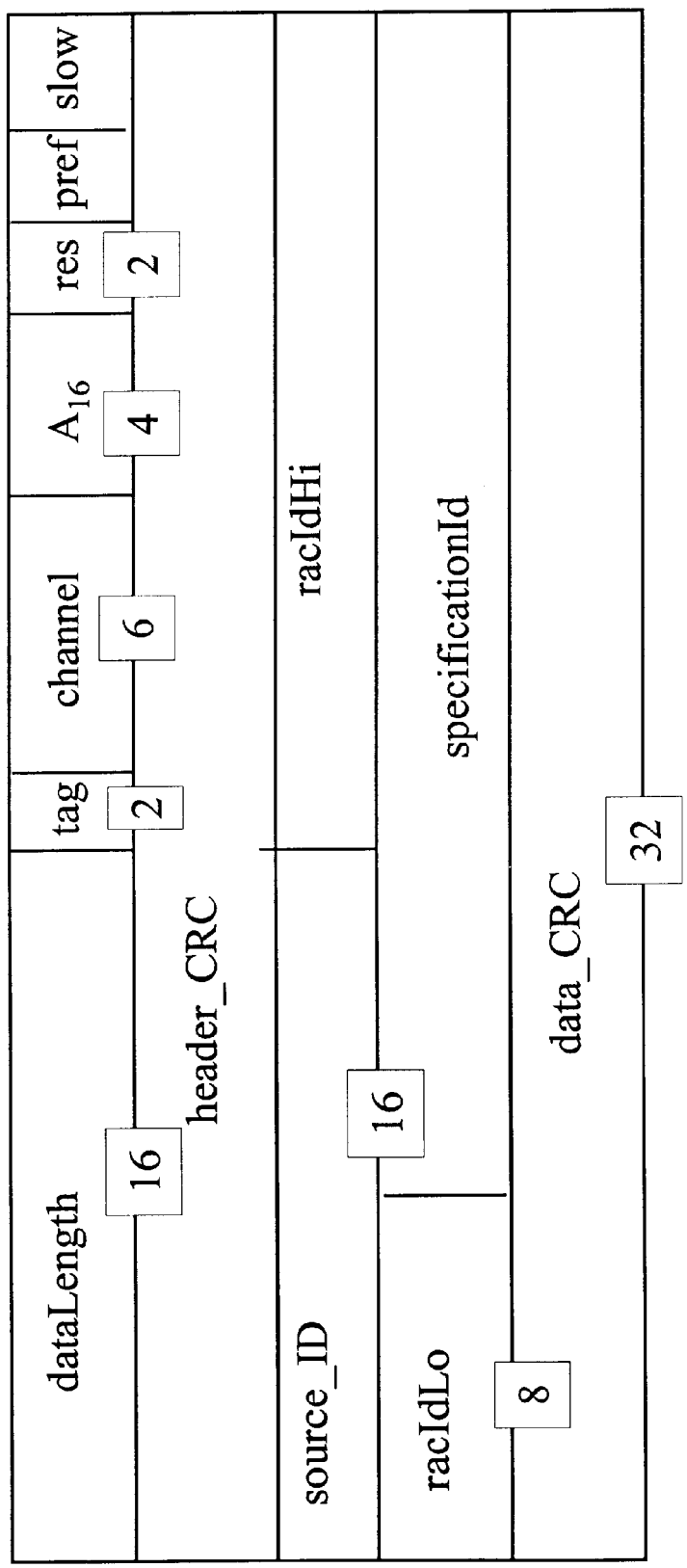
FIG. 11 is a schematic view depicting the structure of a synchronization command.

FIG. 11 depicts the entire format of a command for modifying the duration of the cycle of the clock of the "Cycle Master" of a bus under consideration. It should be noted that the figures written for each field correspond to the size of the field in number of bits.

Such a command tells the clock of the "Cycle Master" under consideration that the frequency of the said clock must be increased or reduced or even retained if necessary.

The synchronization commands are GASP ("Global Asynchronous Stream Packet") packets, the data field of which is empty.

The fields named "data_length", "tag, channel", "$A_{16}$", "res", "pref", "racidHi", "racidLo" and "specificationId" have constant values defined by the 1394 standardization committee.

The field having the name "pref" is 1 bit in length.

The field having the name "slow" is 1 bit in length and its value makes it possible to indicate whether it is necessary either to extend the counting by one unit or to reduce it by one unit.

The value of the bit contained in this field is 0 or 1.

When this value is equal to 0, this means that the frequency of the clock of the "Cycle Master" under consideration must be reduced during the following cycle by one unit, that is to say by one clock pulse.

When the value is equal to 1, this means that the clock frequency during the following cycle must be increased by one unit.

The value of the field "header_CRC" is calculated as a function of the value of the fields "data_length", "tag", "channel", "$A_{16}$", "res", "pref" and "slow".

The value of the field "source_ID" makes it possible to specify the address of the portal sending the synchronization command.

The value of the field data_CRC is calculated as a function of the value of the fields "source_ID", "racidHi", "racidLo", and "specificationId".

What is claimed is:

1. A method of controlling the synchronization in a data packet communication network having at least two serial communication buses interconnected by a bridge and each defining successive time cycles each having a duration specific to the bus under consideration, said method comprising the following steps:

detecting a relative drift between the respective cycles of the at least two serial communication buses;

transmitting a command for modifying the duration of the cycle of one of the at least two serial communication buses; and delaying at least one of the steps of detecting a drift and transmitting a command for modifying the duration of the cycle.

2. A method according to claim 1, wherein the delay extends over a number of cycles.

3. A method according to claim 1 wherein the delay starts after said step of detecting a relative drift between the respective cycles of the at least two serial communication buses.

4. A method according to claim 1, wherein the delay has a number of detection steps.

5. A method according to claim 1 wherein the delay ends before said step of detecting a relative drift between the respective cycles of the at least two serial communication buses.

6. A method according to claim 5, further comprising a step of comparing the detected drift with a predetermined threshold when a non-null drift is detected.

7. A method according to claim 6, wherein the threshold is positive or null.

8. A method according to claim 6, wherein the threshold is negative or null.

9. A method according to claim 6, further comprising a step of transmitting at least one command for modifying the duration of the cycle of one of the at least two serial communication buses when the detected drift is greater in absolute value than the absolute value of the predetermined threshold.

10. A method according to claim 5, further comprising a step of transmitting at least one command for modifying the duration of the cycle of one of the at least two serial communication buses when a non-null drift is detected.

11. A method according to claim 1, wherein the modification is proportional to the detected drift.

12. A method according to claim 1, wherein the transmission of a command takes place as long as the detected drift is not null.

13. A method according to claim 5, wherein said transmission step does not transmit the command when the delay comes to an end and the detected drift is null.

14. A method according to claim 1, further comprising a step of storing the detected drift, wherein said step of storing the detected drift includes an operation of summing the detected drift with a stored drift for an earlier cycle.

15. A method according to claim 14, further comprising a step of comparing the stored drift with a predetermined threshold.

16. A method according to claim 15, wherein the threshold is positive or null.

17. A method according to claim 15, wherein the threshold is negative or null.

18. A method according to claim 15, wherein when the stored drift is greater in absolute value than the absolute value of the predetermined threshold the delay comes to an end.

19. A method according to claim 1, wherein said transmission step transmits when the delay comes to an end.

20. A method according to claim 14, wherein the transmission of a command takes place as long as the stored drift is not null.

21. A method according to claim 14, further comprising a step of decrementing the absolute value of the stored drift by a value adapted to the modification of the duration of the cycle of one of the at least two serial communication buses.

22. A method according to claim 1, wherein the delay extends over a predetermined number of cycles allocated to the bridge under consideration.

23. A method according to claim 22, wherein the communication network has a number of serial communication buses interconnected by bridges and forming a structure with a tree hierarchy from a "root" bus, the predetermined number of cycles allocated to a bridge depends on the position of the bridge in the structure with a tree hierarchy.

24. A method according to claim 23, wherein the further away a bridge is from the "root" bus in the structure with a tree hierarchy, the larger is the predetermined number of cycles allocated to the bridge.

25. A method according to claim 22, wherein the predetermined number of cycles allocated to the bridge depends on the drift detected during at least one earlier delay.

26. A method according to claim 1, wherein each of the at least two serial communication buses having an internal clock having a given clock frequency, the duration T of a cycle specific to a serial communication bus being determined by a number $n_{init}$ of clock pulses generated by the internal clock of the bus during this cycle according to the relationship $T=n_{init}/F$, where F designates the frequency of the clock under consideration, said step of detecting the relative drift between the respective cycles of the clocks of the at least two serial communication buses consists of comparing, with one another, the number of pulses generated by the clocks.

27. A method according to claim 1, wherein the serial communication buses are in accordance with the IEEE 1394 standard.

28. A device for controlling synchronization in a data packet communication network having at least two serial communication buses interconnected by a bridge, the bridge providing the interface between the at least two serial communication buses, which each define successive time cycles each having a duration specific to the bus under consideration, said device comprising:

means of detecting a relative drift between the respective cycles of the at least two communication buses, means of transmitting a command for modifying the duration of the cycle of one of the at least two serial communication buses; and means of delaying at least one of the actions of detecting a drift and transmitting a command for modifying the duration of a cycle.

29. A device according to claim 28, further comprising means of comparing the detected drift with a determined threshold.

30. A device according to claim 29, wherein the threshold is positive.

31. A device according to claim 29, wherein the threshold is negative.

32. A device according to claim 28, wherein the modification is proportional to the detected drift.

33. A device according claim 28, further comprising means of storing the detected drift, wherein said means of storing the detected drift performs an operation of summing the detected drift with a stored drift for an earlier cycle.

34. A device according to claim 28, further comprising means of comparing the stored drift with a predetermined threshold.

35. A device according to claim 34, wherein the threshold is positive or null.

36. A device according to claim 34, wherein the threshold is negative or null.

37. A device according to claim 32, wherein the modification is proportional to the stored drift.

38. A device according to claim 28, wherein each of the at least two serial communication buses having an internal clock having a given clock frequency, the duration T of a cycle specific to a serial communication bus being determined by a number $n_{init}$ of clock pulses generated by the internal clock of the bus during this cycle according to the relationship $T=n_{init}/F$, where F designates the frequency of the clock under consideration, said means of detecting the relative drift between the respective cycles of the clocks of the at least two serial communication buses have means of comparing, with one another, the number of pulses generated by the clocks.

39. A device according to claim 28, wherein the serial communication buses are in accordance with the IEEE 1394 standard.

40. A bridge providing the interface between at least two serial communication buses in a data packet communication network, said device wherein the bridge has a device for controlling synchronization in the network according to claim 28.

41. A data packet communication network having at least two serial communication buses interconnected by a bridge wherein the bridge is in accordance with claim 40.

42. An information storage means, possibly totally or partially removable, readable by a computer or a processor containing instructions of a computer program, wherein said information storage means allows implementation of a method of controlling synchronization in a data packet communication network according to claim 1.

* * * * *

UNITED STATES PATENT AND TRADEMARK OFFICE
CERTIFICATE OF CORRECTION

PATENT NO. : 6,778,543 B1
DATED : August 17, 2004
INVENTOR(S) : Laurent Frouin et al.

It is certified that error appears in the above-identified patent and that said Letters Patent is hereby corrected as shown below:

Column 10,
Line 32, "1394PHY/LINK" should read -- 1394 PHY/LINK --.

Column 11,
Line 65, "he" should read -- the --.

Column 12,
Line 51, "instruments" should read -- Instruments --.

Column 13,
Line 31, "Buses and 42" should read -- Buses 42 and 44 --.

Column 18,
Line 53, "Initialized" should read -- initialized --.

Column 20,
Line 7, "crossed" should read -- crossed. --.
Line 40, "Maximum" should read -- maximum --.

Column 21,
Line 2, "re" should read -- are --.
Line 10, "FIG. 6" should read -- FIG 6. --.
Line 11, "because. In" should read -- because, in --.

Column 23,
Lines 49 and 55, "claim 1" should read -- claim 1, --.

Column 24,
Line 29, "threshold" should read -- threshold, --.
Line 65, "consists" should read -- consist --.

UNITED STATES PATENT AND TRADEMARK OFFICE
CERTIFICATE OF CORRECTION

PATENT NO. : 6,778,543 B1
DATED : August 17, 2004
INVENTOR(S) : Laurent Frouin et al.

It is certified that error appears in the above-identified patent and that said Letters Patent is hereby corrected as shown below:

Column 26,
Line 24, "network" should read -- network, said device --.

Signed and Sealed this

Sixteenth Day of November, 2004

JON W. DUDAS
*Director of the United States Patent and Trademark Office*